(12) United States Patent
Li et al.

(10) Patent No.: US 10,560,859 B2
(45) Date of Patent: Feb. 11, 2020

(54) CHANNEL STATE INFORMATION MEASUREMENT METHOD AND USER EQUIPMENT

(71) Applicant: Samsung Electronics Co., Ltd., Gyeonggi-do (KR)

(72) Inventors: Yingyang Li, Beijing (CN); Yi Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/525,125

(22) PCT Filed: Nov. 6, 2015

(86) PCT No.: PCT/KR2015/011893
§ 371 (c)(1),
(2) Date: May 8, 2017

(87) PCT Pub. No.: WO2016/072784
PCT Pub. Date: May 12, 2016

(65) Prior Publication Data
US 2018/0279149 A1    Sep. 27, 2018

(30) Foreign Application Priority Data

Nov. 7, 2014   (CN) .......................... 2014 1 0643592
Jun. 17, 2015  (CN) .......................... 2015 1 0340430

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0057* (2013.01); *H04L 5/0092* (2013.01);
(Continued)

(58) Field of Classification Search
CPC ............. H04W 24/10; H04W 72/0446; H04W 72/085; H04W 72/042; H04L 5/0057
See application file for complete search history.

(56) References Cited

U.S. PATENT DOCUMENTS 9,532,254 B2 *  12/2016  Ko ....................... H04B 7/0626
2012/0040707 A1  2/2012  Kim et al.
(Continued)

FOREIGN PATENT DOCUMENTS

| CN | 103516464 | 1/2014 |
| CN | 103716827 | 4/2014 |

(Continued)

OTHER PUBLICATIONS

PCT/ISA/210 Search Report issued on PCT/KR2015/011893 (pp. 6).
(Continued)

*Primary Examiner* — Lan-Huong Truong
(74) *Attorney, Agent, or Firm* — The Farrell Law Firm, P.C.

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments of the present disclosure provide a channel state information measurement method, including: receiving, by a user equipment (UE), resource indication information for a CSI measurement; performing, by the UE, the CSI measurement according to the resource indication information, and transmitting a Channel Quality Indicator (CQI) report to a control node. According to the present disclosure, users may be scheduled by the base station more effectively and the efficiency of the whole network may be increased.

14 Claims, 8 Drawing Sheets

(51) Int. Cl.
*H04W 72/04* (2009.01)
*H04W 72/08* (2009.01)
*H04W 16/14* (2009.01)

(52) U.S. Cl.
CPC ..... *H04W 72/042* (2013.01); *H04W 72/0446* (2013.01); *H04W 72/085* (2013.01); *H04W 16/14* (2013.01)

(56) References Cited

U.S. PATENT DOCUMENTS

| | | | | |
|---|---|---|---|---|
| 2012/0287875 | A1* | 11/2012 | Kim | H04B 7/024 370/329 |
| 2013/0196675 | A1* | 8/2013 | Xiao | H04W 72/082 455/452.1 |
| 2014/0071848 | A1 | 3/2014 | Park et al. | |
| 2014/0341057 | A1 | 11/2014 | Seo et al. | |
| 2015/0071099 | A1 | 3/2015 | Yi et al. | |
| 2015/0163680 | A1* | 6/2015 | Valliappan | H04W 16/14 370/329 |
| 2015/0282165 | A1 | 10/2015 | Ni et al. | |
| 2017/0223738 | A1* | 8/2017 | Seo | H04W 72/04 |

FOREIGN PATENT DOCUMENTS

| | | |
|---|---|---|
| CN | 104081813 | 10/2014 |
| WO | WO 2012/144842 | 10/2012 |
| WO | WO 2013/042883 | 3/2013 |
| WO | WO 2012/096521 | 7/2013 |
| WO | WO 2013/183946 | 12/2013 |
| WO | WO 2014/116155 | 7/2014 |

OTHER PUBLICATIONS

PCT/ISA/237 Written Opinion issued on PCT/KR2015/011893 (pp. 8).

3rd Generation Partnership Project; Technical Specification Group Radio Access Network; Evolved Universal Terrestrial Radio Access (E-UTRA).

Physical Layer Procedures (Release 12), 3GPP TS 36.213 V12.3.0, Sep. 30, 2014, 212 pages.

Chinese Office Action dated Dec. 4, 2019 issued in counterpart application No. 201510340430.2, 26 pages.

* cited by examiner

[Fig. 1]
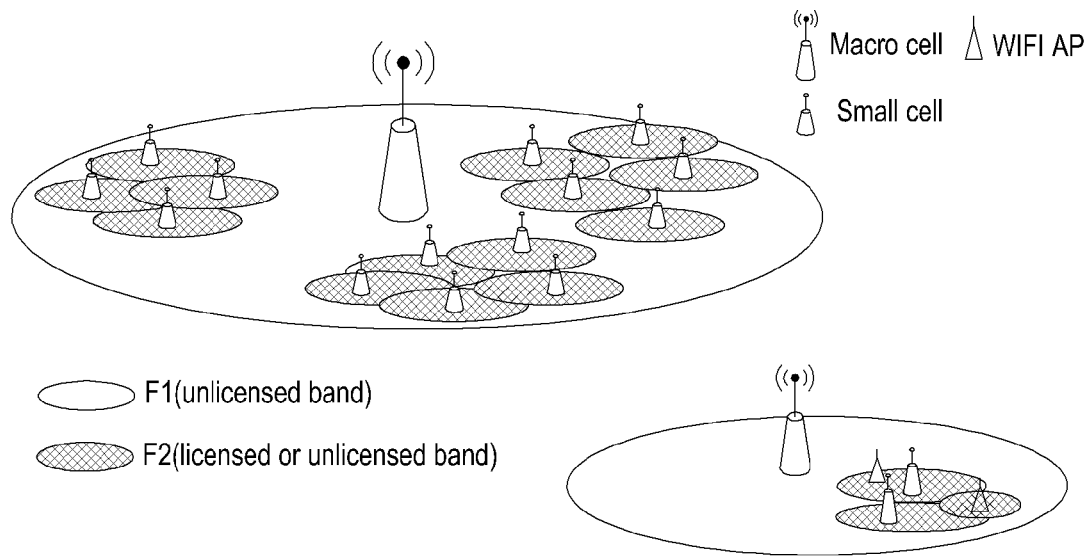
[Fig. 2]
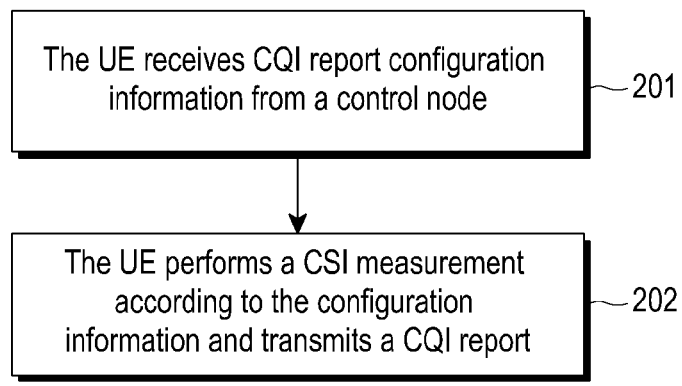

[Fig. 3a]
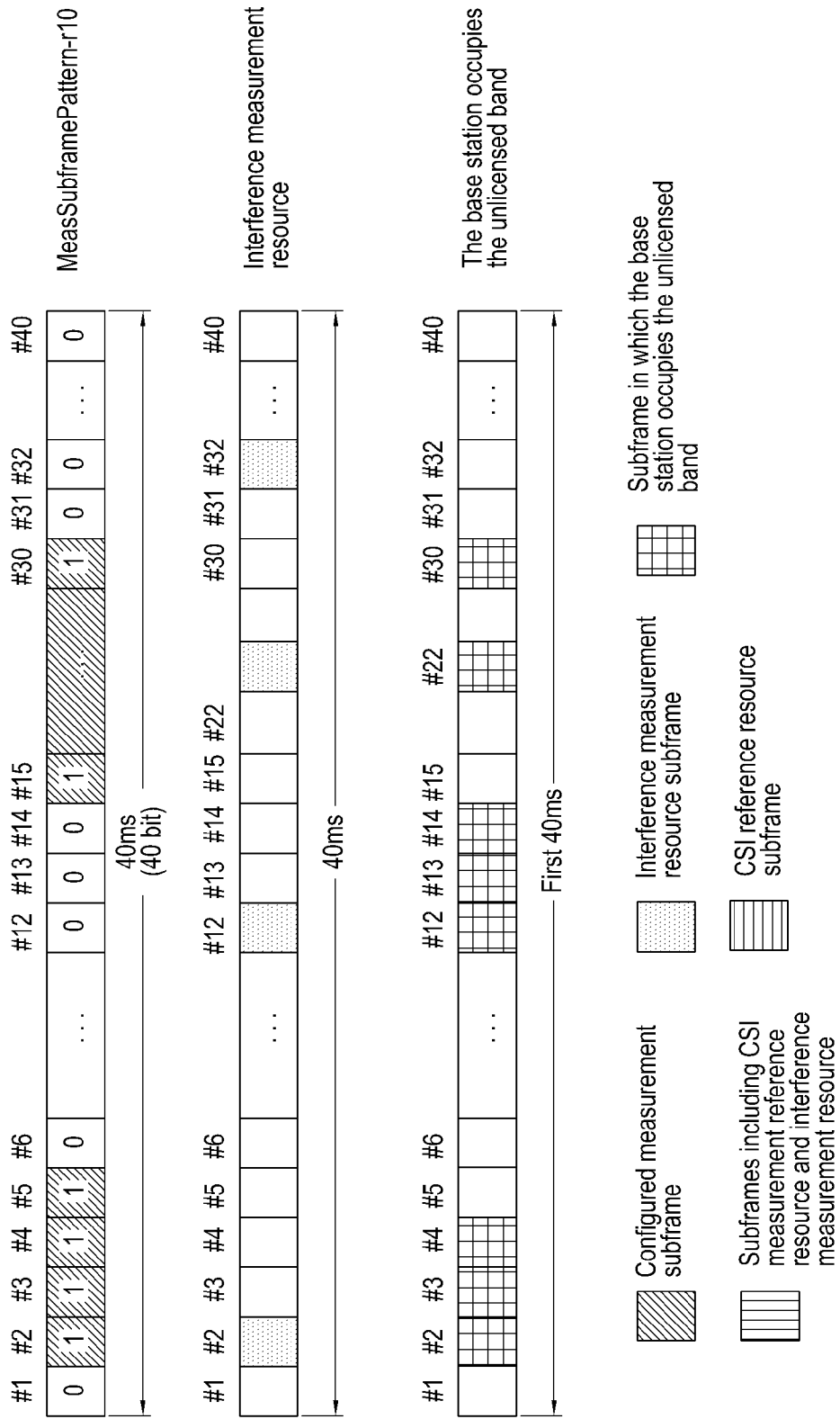

[Fig. 3b]
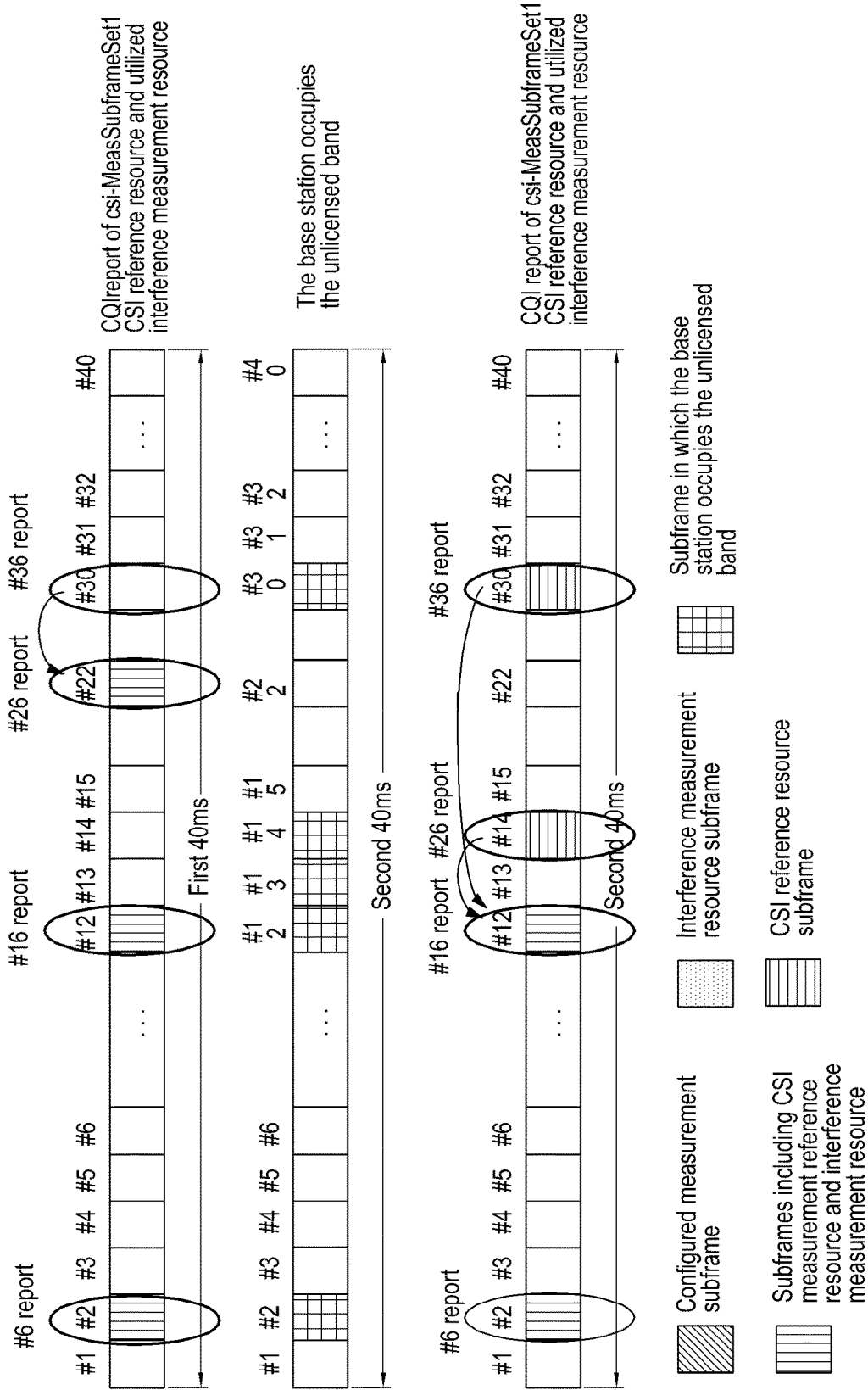

[Fig. 4]
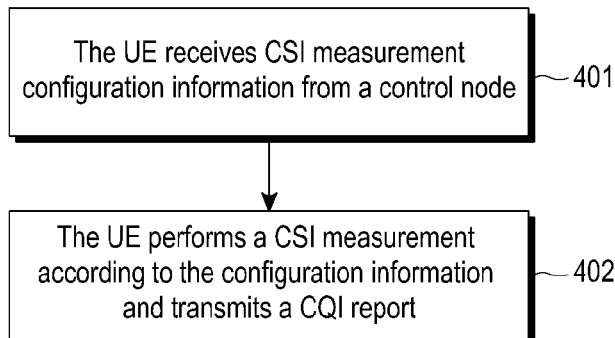
[Fig. 5]
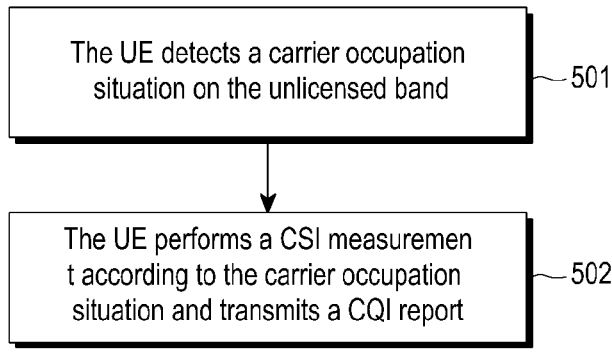
[Fig. 6]
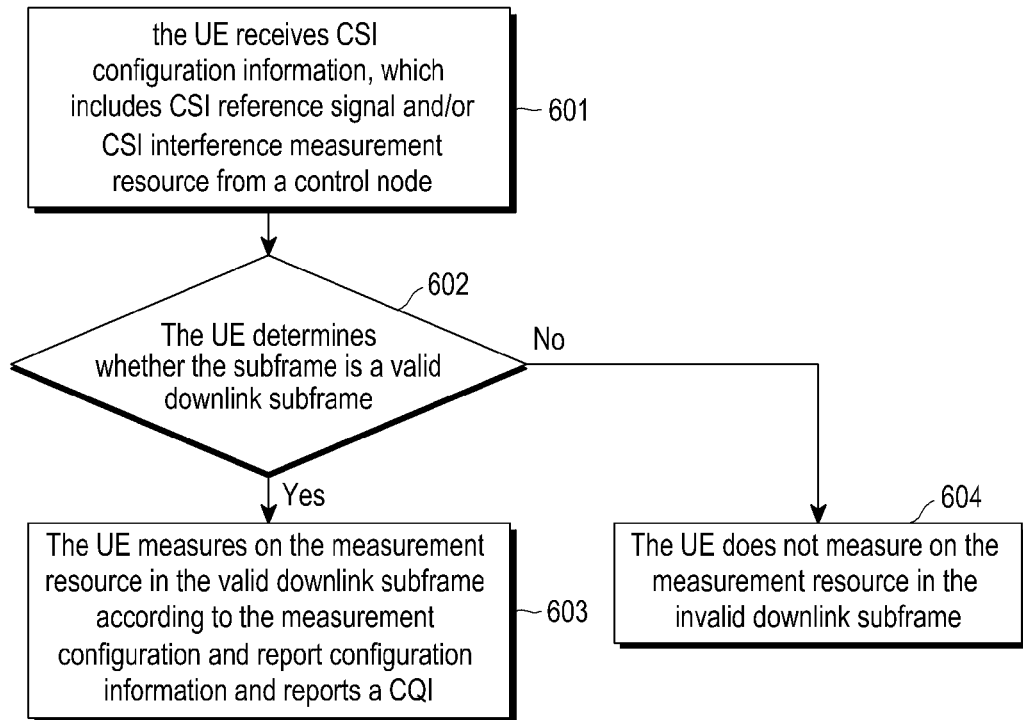

[Fig. 7]
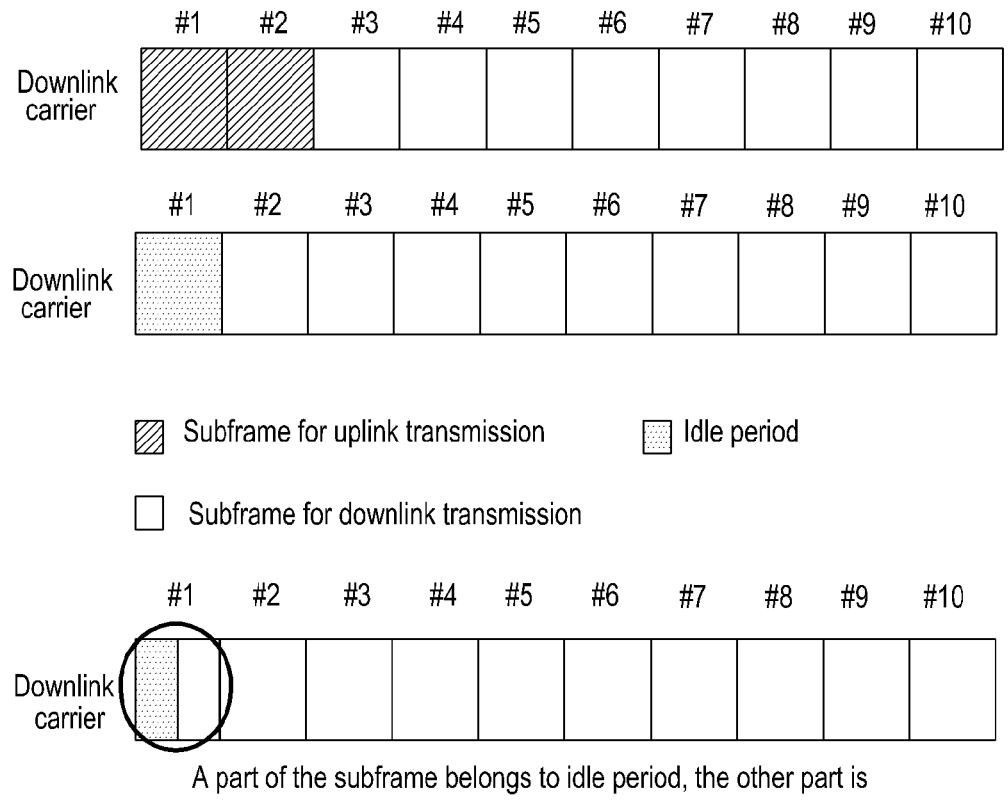
[Fig. 8]
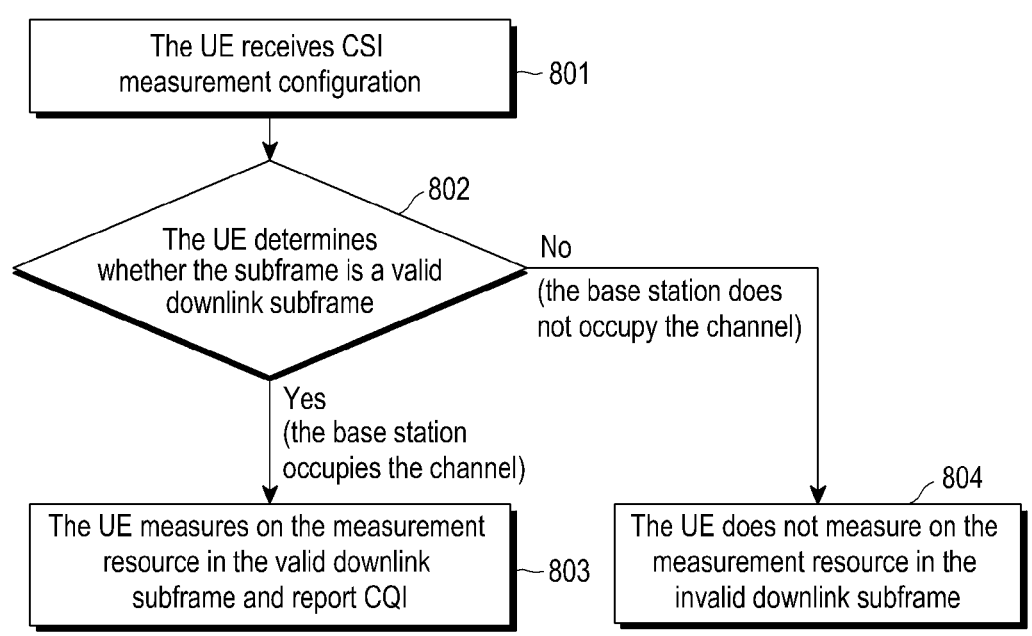

[Fig. 9]
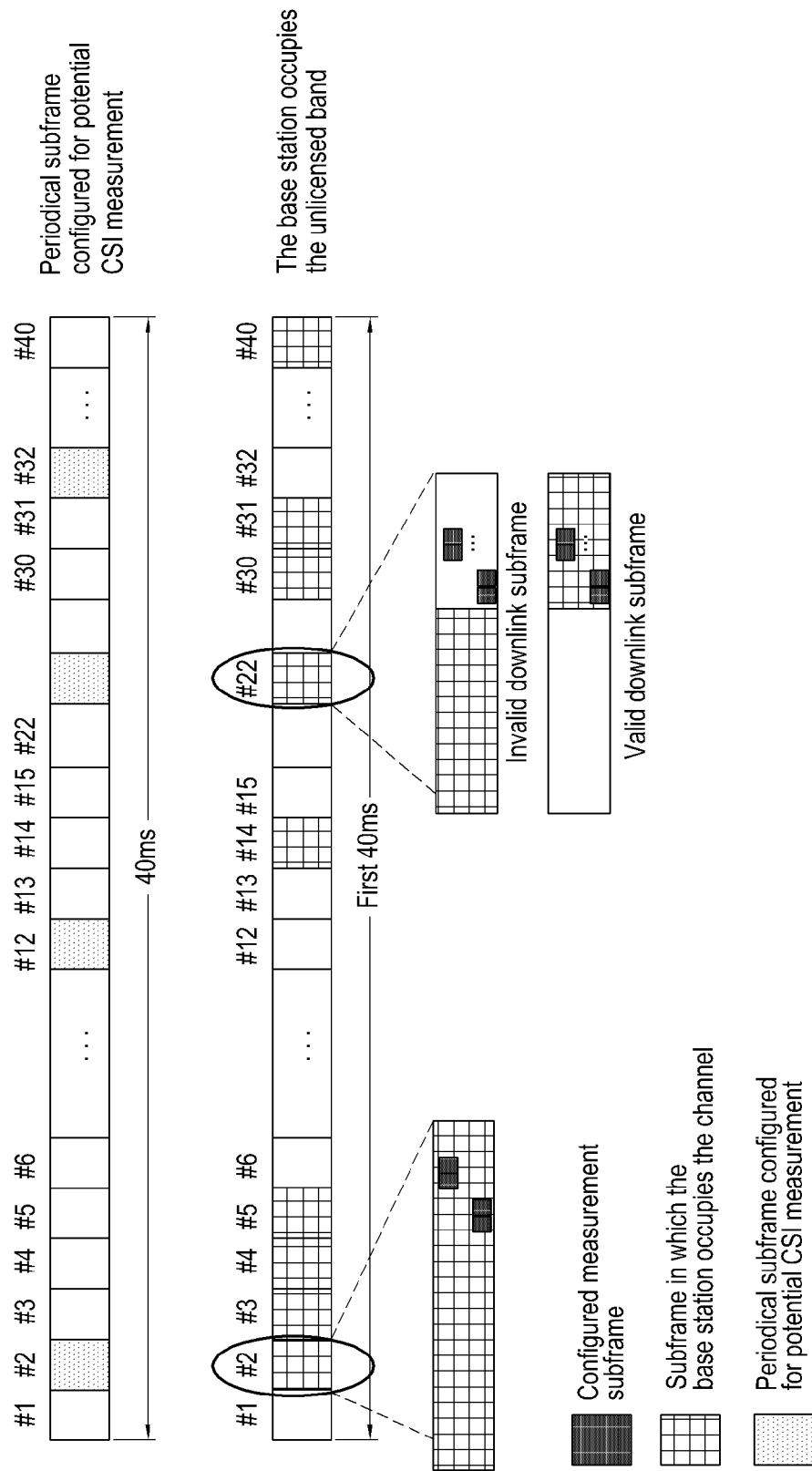

[Fig. 10]
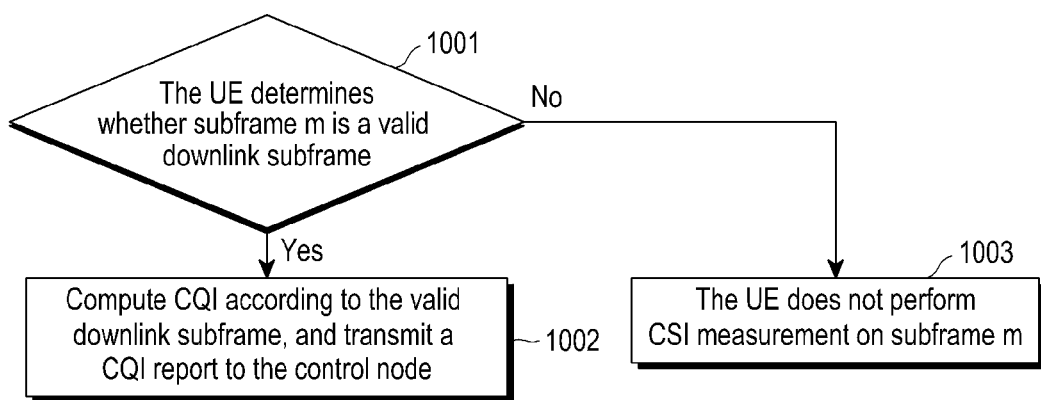
[Fig. 11]
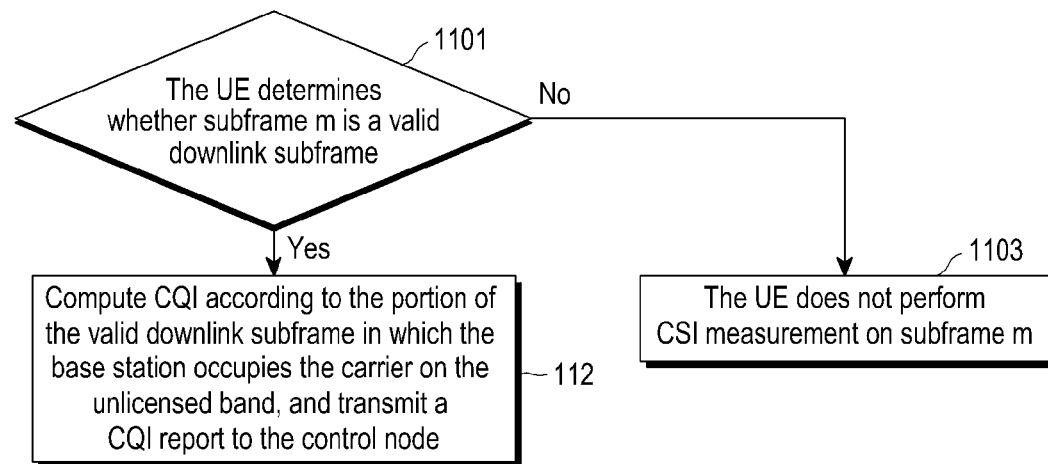

[Fig. 12]
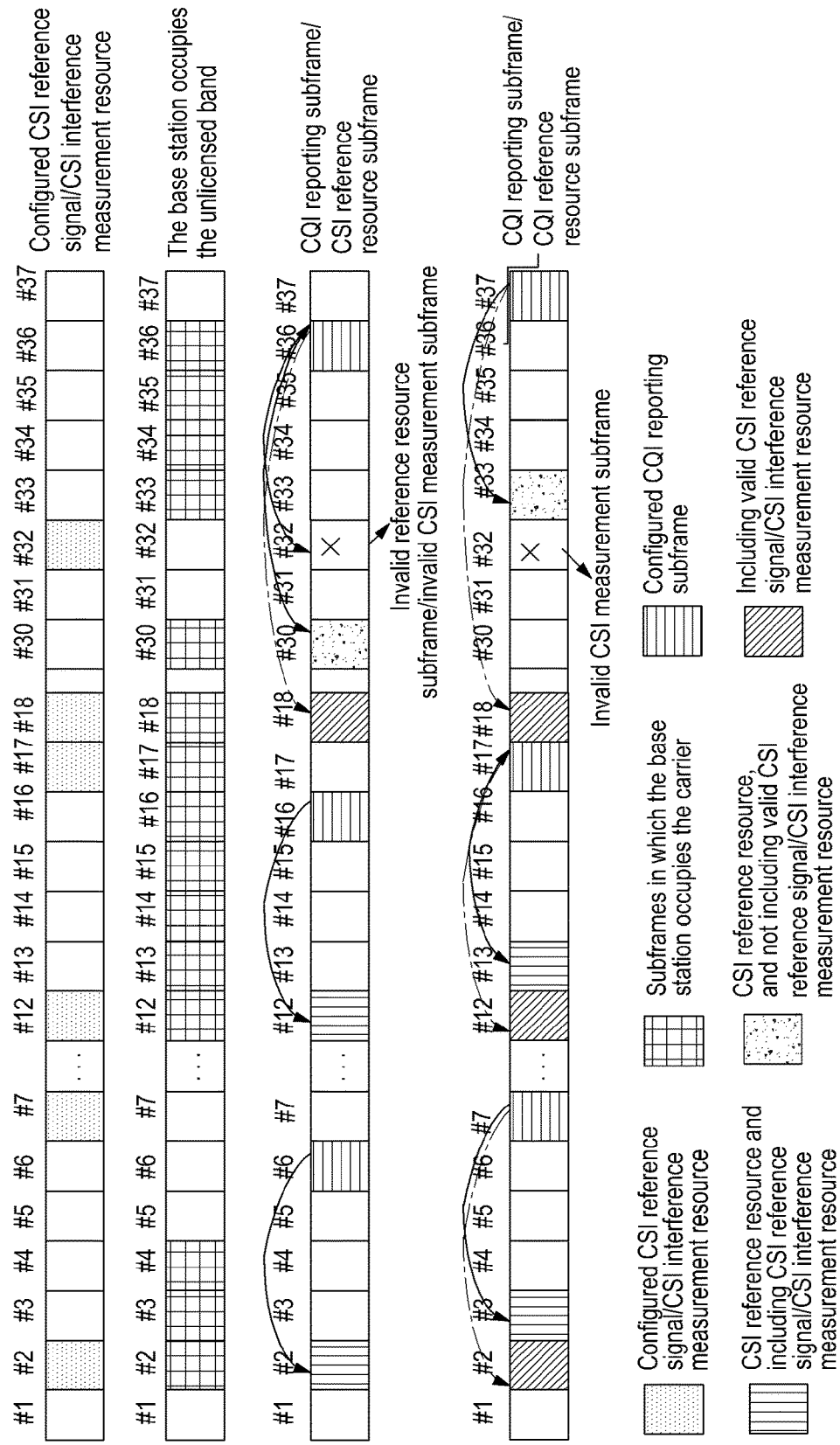

CHANNEL STATE INFORMATION MEASUREMENT METHOD AND USER EQUIPMENT

PRIORITY

This application is a National Phase Entry of PCT International Application No. PCT/KR 2015/011893, which was filed on Nov. 6, 2015, and claims priority to Chinese Patent Application No. 201410643592.9 and Chinese Patent Application No. 201510340430.2, which were filed on Nov. 7, 2014 and Jun. 17, 2015, respectively, the contents of each of which are incorporated herein by reference.

TECHNICAL FIELD

The present disclosure relates to mobile communication techniques, and more particularly, to a channel state information measurement method and user equipment.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Contradictions between the booming of the wireless service requirements of users and the limited spectrum resources become increasingly sharp. Mobile operators have started to consider taking the unlicensed band as a supplement for the licensed band. Therefore, researches about deploying LTE on the unlicensed band are put on agenda. The 3GPP has begun to study how to increase the spectrum utilization ratio of the whole network via the effective carrier aggregation on the unlicensed band and the licensed band in the premise that other techniques on the unlicensed band are not affected apparently.

The unlicensed band has generally been allocated for other purposes, e.g., radar or 802.11 series Wireless Fidelity (WiFi). Thus, on the unlicensed band, the interference level is not fixed, which makes it hard to ensure the Quality of Service (QoS) of the LTE transmission. But the unlicensed band is still able to be used for transmitting data with low QoS requirement. Herein, the LTE system deployed on the unlicensed band is referred to as an LTE-U system. On the unlicensed band, it is a key problem that how to avoid interference between the LTE-U system and the other wireless system such as radar or WiFi. Clear Channel Assessment (CCA) is a collision avoidance mechanism generally adopted on the unlicensed band. One station (STA) has to detect the wireless channel before transmitting signals. The wireless channel can be occupied for transmitting signals only when it is detected that the channel is clear. The LTE-U also follows a similar mechanism, so as to ensure a low interference to other signals. In a relatively simple method, an LTE-U device (base station or user equipment) is dynamically on/off according to a CCA result, i.e., transmit signals when detecting the channel is clear, and not transmit signals when detecting the channel is occupied.

In the LTE system, especially for the downlink, in order to support link adaptation of the base station, the UE needs to report downlink Channel State Information (CSI) to the base station.

The UE measures the channel based on downlink reference signals, such as Cell specific Reference Signal (CRS) or Non-Zero Power Channel State Information Reference Signal (NZP-CSI-RS) or Zero Power CSI-RS (ZP-CSI-RS), and reports Channel Quality Indicator (CQI) to the base station.

The UE may report the CQI periodically or may report the CQI non-periodically under the trigger of the base station. The existing downlink reference signals used for channel measurement are transmitted periodically. Therefore, the UE may obtain one or more channel measurement samples according to these signals, and combine the channel measurement samples to generate a corresponding CQI and report the CQI to the base station.

It should be noted that, the above description of the background is merely used for giving a clear and complete description to the technical solution of the present disclosure and for facilitating the understanding of those with ordinary skill in the art. The description should not be regarded as well-known for those with ordinary skill in the art merely because they are placed in the background.

DISCLOSURE OF INVENTION

Technical Problem

On the unlicensed band, since the LTE-U device determines whether to transmit signals according to the CCA result dynamically, the LTE-U device may does not transmit any signal during a long time period. As such, the UE cannot perform CSI measurement (H measurement) based on the reference signals. If the CQI reported by the UE is derived based on a channel before a long time, the channel when the UE reports the CQI cannot be reflected. In addition, when the LTE-U base station schedules the UE, since other wireless communication systems around the base station are usually in the off state, i.e., do not transmit signals, whereas when the LTE-U base station does not occupy the unlicensed band, the other wireless communication systems around the base station are in the on state, i.e., transmit signals, the interference levels under these two situations are different. If the CQI reported by the UE is able to completely reflect the channel quality when the LTE-U base station schedules the UE, the CQI may provide a reference for the scheduling of the base station more accurately. It is an urgent problem to be solved how to let the CSI reported by the UE reflect the channel quality when the LTE-U base station schedules the UE more accurately, so as to realize efficient scheduling of the users by the base station.

Solution to Problem

Embodiments of the present disclosure provide a channel state information measurement method and user equipment, so as to reflect the channel quality when the UE is scheduled on the unlicensed band more accurately, and realize effective scheduling for the base station, thereby increasing efficiency of a whole network.

In order to achieve the above objective, the present disclosure provides a following technical solution.

A channel state information measurement method, including:

receiving, by a user equipment (UE), resource indication information for a CSI measurement;

performing, by the UE, the CSI measurement according to the resource indication information, and transmitting a Channel Quality Indicator (CQI) report to a control node.

In one embodiment, the resource indication information is CSI measurement configuration information, wherein the CSI measurement configuration information includes channel measurement and/or interference measurement resource configuration information, for indicating aperiodic channel measurement and/or interference measurement resource;

the UE performing the CSI measurement includes: performing, by the UE, the CSI measurement on the channel measurement and/or interference measurement resource indicated by the channel measurement and/or interference measurement resource configuration information in a predefined subframe.

In one embodiment, the channel measurement and/or interference measurement resource configuration information includes channel measurement and/or interference measurement resource pattern information, wherein the channel measurement and/or interference measurement resource pattern information includes: indication information of one of N preconfigured patterns, or, indication information of one of N preconfigured patterns configured by higher layer, or, information of one preconfigured pattern.

In one embodiment, the channel measurement and/or interference measurement pattern information is comprised in physical layer signaling for indicating cell on/off, or included in physical signaling used for indicating whether the carrier on the unlicensed band is occupied by the control node, or included in physical layer signaling for indicating whether the carrier on the unlicensed band is occupied by another wireless communication system other than the system where the UE belongs to, or included in physical signaling dedicated for indicating the channel measurement and/or interference measurement resource; or included in physical layer signaling for scheduling the UE.

In one embodiment, the CSI measurement configuration information further includes interference measurement resource type information, used for indicating that the interference measurement resource corresponds to a type that the control node occupies the carrier on the unlicensed band, wherein the control node transmits signals on the unlicensed band, or corresponds to a type that the control node does not occupy the carrier on the unlicensed band, wherein the control node does not transmit any signal on the unlicensed band;

wherein the CQI report is generated according to one or more measurement results on interference measurement resource of the same type; and measurement results on interference measurement resource of different types cannot be combined.

In one embodiment, the method further includes:

detecting, by the UE, a carrier occupation situation on the unlicensed band;

the UE performing the CSI measurement includes: performing, by the UE, the CSI measurement according to the detected carrier occupation situation on the unlicensed band, and transmitting the CQI report to the control node; wherein when the control node occupies the unlicensed band, the UE performs the CSI measurement on the predefined channel measurement and interference measurement resource. Accordingly, UE does not perform the CSI measurement outside of the control node transmission periods.

In one embodiment, the predefined channel measurement and interference measurement resource is a first subframe in which the control node occupies the unlicensed band; and/or the predefined channel measurement and interference measurement resource is on predefined positions of a subframe in which a preamble is transmitted.

In one embodiment, if the length of the first subframe or the subframe in which the preamble is transmitted is not enough for mapping the predefined channel measurement and/or interference measurement resource, the UE performs the CSI measurement on predefined channel measurement and interference measurement resource in a next subframe.

In one embodiment, if there is data transmission in the subframe where the predefined channel measurement and interference measurement resource is present, performing, by the UE, rate matching or punching, to avoid mapping to the predefined channel measurement and interference measurement resource; and/or receiving, by the UE, data according to the predefined channel measurement and interference measurement resource indicated by the control node following a predefined rate matching or punching manner.

In one embodiment, the predefined rate matching or punching manner is indicated by at least one bit transmitted by the control node.

In one embodiment, the bit is in Downlink Control Information DCI in a UE-specific search space, and enablement of the bit is indicated via higher layer signaling, wherein the high layer signaling is UE-specific, or cell-specific or group-specific.

In one embodiment, before the UE transmitting the CQI report to the control node, the method further includes: receiving, by the UE, CSI reference signal configuration information and/or CSI interference measurement resource configuration information transmitted by the control node, determining, by the UE toward earlier subframes from subframe $n-n_{CQI\_ref}$ or a most recent subframe before subframe $n-n_{CQI-ref}$ where the resource indicated by the configuration information is located in turn, whether a subframe where the indicated resource is located is a valid downlink subframe, if the subframe is a valid downlink subframe, performing the CQI measurement on the valid downlink subframe, and generating the CQI report according to the valid downlink subframe; otherwise, keeping on the determining operation until a valid downlink subframe is found; wherein the subframe n is used for feeding back the CQI report.

In one embodiment, before the UE transmitting the CQI report to the control node, the method further comprises: receiving, by the UE, CSI reference signal configuration information and/or CSI interference measurement resource configuration information transmitted by the control node, determining, by the UE toward earlier subframes from subframe n-n$_{CQI\_ref}$ in turn, whether each subframe where the indicated resource is located is a valid downlink subframe, if the subframe is a valid downlink subframe, taking the valid downlink subframe as a first valid downlink subframe, generating the CQI report according to the first valid downlink subframe, and ending the determination; otherwise, keeping on the determination until a valid downlink subframe is found;

wherein the generating the CQI report according to the first valid downlink subframe comprises: if the first valid downlink subframe is not the subframe where the resource indicated by the CSI reference signal configuration information and/or CSI interference measurement resource configuration information transmitted by the control node is located, determining, toward earlier subframes from the first valid downlink subframe in turn, whether each subframe where the resource indicated by the CSI reference signal configuration information and/or CSI interference measurement resource configuration information is located is a valid downlink subframe, until the valid downlink subframe is found, and taking the valid downlink subframe as a second valid downlink subframe, performing the CSI measurement according to the second valid downlink subframe, taking the first valid downlink subframe as a CSI reference resource subframe, and generating the CQI report according to the first valid downlink subframe; otherwise, performing the CSI measurement on the resource of the first valid downlink subframe in which the unlicensed band is occupied, and generating the CQI report; wherein the subframe n is used for feeding back the CQI report.

In one embodiment, if the subframe is one of all subframes capable of being used for downlink transmission, or is one of all subframes capable of being used for downlink transmission configured by the system, and if following requirements are met, the subframe is a valid downlink subframe; otherwise, the subframe is not a valid downlink subframe;

the subframe is configured as a downlink subframe or a special subframe for that UE, and in case multiple cells with different uplink-downlink configurations are aggregated and the UE is not capable of simultaneous reception and transmission in the aggregated cells, the subframe in the primary cell is a downlink subframe or a special subframe with the length of DwPTS more than 7680×T$_s$, and except for transmission mode 9 or 10, it is not an MBSFN subframe, and it does not contain a DwPTS field in case the length of DwPTS is 7680×T$_s$ and less, and it does not fall within a configured measurement gap for that UE, and for periodic CSI reporting, it is an element of the CSI subframe set linked to the periodic CSI report when that UE is configured with CSI subframe sets, and for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

In one embodiment, if the control node does not occupy the carrier on the unlicensed band in the subframe where the resource indicated by the configuration information is located, the subframe where the resource indicated by the configuration information is not a valid downlink subframe;

if all or more than a predefined proportion of the resource indicated by the configuration information is within the part of the subframe in which the control node occupies the carrier on the unlicensed band, and the subframe where the resource indicated by the configuration information meets following requirements, the subframe is a valid downlink subframe; otherwise, the subframe is not a valid downlink subframe;

the subframe is configured as a downlink subframe or a special subframe for that UE, and in case multiple cells with different uplink-downlink configurations are aggregated and the UE is not capable of simultaneous reception and transmission in the aggregated cells, the subframe in the primary cell is a downlink subframe or a special subframe with the length of DwPTS more than 7680×T$_s$, and except for transmission mode 9 or 10, it is not an MBSFN subframe, and it does not contain a DwPTS field in case the length of DwPTS is 7680×T$_s$ and less, and it does not fall within a configured measurement gap for that UE, and for periodic CSI reporting, it is an element of the CSI subframe set linked to the periodic CSI report when that UE is configured with CSI subframe sets, and for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

In one embodiment, all of the resource indicated by the configuration information is within the part of the subframe in which the control node occupies the carrier on the unlicensed band comprises: all of the CSI interference measurement resource is within the part of the subframe in which the control node occupies the carrier on the unlicensed band, or, both the CSI interference measurement resource and the CSI channel measurement resource are within the part of the subframe in which the control node occupies the carrier on the unlicensed band.

In one embodiment, when determining the first valid downlink subframe, if the control node does not occupy the carrier on the unlicensed band in the subframe where the indicated resource is located, the subframe n-n$_{CQI\_ref}$ or a subframe before subframe n-n$_{CQI\_ref}$ is not a valid downlink subframe;

if the control node occupies the carrier on the unlicensed band in all parts or more than a predefined proportion in subframe n-n$_{CQI\_ref}$ or a subframe before subframe n-n$_{CQI\_ref}$ and a following condition is met, the subframe is a valid downlink resource; otherwise, the subframe is not a valid downlink subframe;

the subframe is a configured downlink subframe or a special subframe for that UE; and in case multiple cells with different uplink-downlink configurations are aggregated and the UE is not capable of simultaneous reception and transmission in the aggregated cells, the subframe in the primary cell is a downlink subframe or a special subframe with the length of DwPTS more than 7680×T$_s$, and except for transmission mode 9 or 10, it is not an MBSFN subframe, and it does not contain a DwPTS field in case the length of DwPTS is 7680×T$_s$ and less, and it does not fall within a configured measurement gap for that UE, and for periodic CSI reporting, it is an element of the CSI subframe set linked to the periodic CSI report when that UE is configured with CSI subframe sets, and for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

In one embodiment, different valid downlink subframe determining methods are adopted for determining the first valid downlink subframe and the second valid downlink subframe.

A UE for channel state information measurement, including: a receiving unit, a measurement unit and a reporting unit;

the receiving unit is adapted to receive resource indication information used for CSI measurement;

the measurement unit is adapted to perform a CSI measurement according to the resource indication information; and the reporting unit is adapted to feed back a channel quality indicator report to a control node.

It can be seen from the above technical solution that, in the CSI measurement method and UE provided by the present disclosure, the UE receives the resource indication information for performing CSI measurement, performs CSI measurement according to the resource indication information and transmits a CQI report to the control node. In particular, through configuring the CQI report or the CSI measurement in advance, or through the determination on the valid downlink subframe and the carrier occupation situation of the control node on the unlicensed band, it is possible to perform the CSI measurement or report the measurement result respectively with respect to the situation that the control node occupies or not occupy the carrier on the unlicensed band. As such, the reported CQI may reflect the channel quality when the LTE-U base station schedules the UE more accurately, users may be scheduled by the base station more effectively and the efficiency of the whole network is increased.

BRIEF DESCRIPTION OF DRAWINGS

FIG. 1 is a schematic diagram illustrating a joint network scenario of the unlicensed band and the licensed band.

FIG. 2 is a flowchart illustrating a CSI measurement method according to a first embodiment of the present disclosure.

FIG. 3a,b is a schematic diagram illustrating interference measurement resource and CSI measurement subframe set in the first embodiment of the present disclosure.

FIG. 4 is a schematic diagram illustrating a CSI measurement method according a second embodiment of the present disclosure.

FIG. 5 is a flowchart illustrating a CSI measurement method according to a third embodiment of the present disclosure.

FIG. 6 is a flowchart illustrating a CSI measurement method according to a fourth embodiment of the present disclosure.

FIG. 7 is a schematic diagram illustrating subframes may be used as downlink subframes according to an embodiment of the present disclosure.

FIG. 8 is a flowchart illustrating a CSI measurement method according to a fifth embodiment of the present disclosure.

FIG. 9 is a schematic diagram illustrating a valid downlink subframe determining method according to the fifth embodiment of the present disclosure.

FIG. 10 is a flowchart illustrating a CSI measurement method according to a sixth embodiment of the present disclosure.

FIG. 11 is a flowchart illustrating a CSI measurement method according to a seventh embodiment of the present disclosure.

FIG. 12 is a flowchart illustrating an eighth embodiment of the present disclosure.

BEST MODE FOR CARRYING OUT THE INVENTION

The present disclosure will be described in further detail hereinafter with reference to accompanying drawings and embodiments to make the objective, technical solution and merits therein clearer.

The channel state information measurement method provided by the present disclosure includes: a UE receives resource indication information for performing a CSI measurement; the UE performs the CSI measurement according to the resource indication information, and reports a channel quality indicator report to a control node.

In particular, considering that the interference levels on the unlicensed band when the base station occupies and does not occupy resources on the unlicensed band are different, the UE does not combine channel measurement result obtained when the base station occupies the unlicensed band with that obtained when the base station does not occupy the unlicensed band when feeding back the CQI report. Hereinafter, the CSI measurement method provided by the present disclosure is described in further detail with reference to several implementation manners.

Embodiment 1

This embodiment provides a CSI measurement method. A CQI report of the UE is configured in advance, to indicate the UE respectively report CQI on the unlicensed band when the control node occupies or does not occupy the carrier on the licensed band or when another system occupies the carrier on the unlicensed band. The CSI may consist of Channel Quality Indicator (CQI), Precoding Matrix Indicator (PMI), Precoding Type Indicator (PTI), and Rank Indication (RI). The content of CSI depends on the configured feedback mode. For example, the CSI may only consist of CQI. Or, CSI may consist of CQI/PMI/RI wherein the CQI is calculated based on the PMI/RI, i.e., CQI/PMI/RI is measured according to the same set of reference signal. Hereinafter, the content of the CSI is referred to as CQI report for facilitating the description. The method provided by the present embodiment includes the following.

The UE receives CQI report configuration information from a control node; wherein the CQI report configuration information is used for indicating the UE to report a CQI report with respect to situations that the base station occupies the carrier on the unlicensed band or not occupy the carrier on the unlicensed band.

The UE performs a CSI measurement on corresponding channel measurement and interference measurement resources according to the CQI report configuration information, and transmits a CQI report generated according to the CQI report configuration information to the control node. Reference signals that the channel measurement is based on may be existing Cell-specific Reference Signal (CRS), Channel-State Information Reference Signals (CSI-RS) or newly-defined signals, e.g., preamble. The interference measurement resource may be existing CRS, Zero Power-CSI-RS (ZP-CSI-RS) (IMR) or newly-defined resources. In an existing LTE system, for transmission modes 1~8, the channel measurement and the interference measurement are both based on the CRS. For transmission mode 9, the Channel measurement is based on the CSI-RS, and the interference measurement is based on the CRS. For transmission mode 10, the channel measurement is based on the CSI-RS, and the interference measurement is based on the IMR. This embodiment is not restricted to the relationship between the existing transmission modes and the channel measurement and/or the interference measurement resources. For example, for transmission mode 10, it is also possible that the channel measurement is based on the CSI-RS, and the interference measurement is based on the CRS, or newly-defined measurement resource.

Hereinafter, the measurement method of this embodiment is described with reference to the flowchart as shown in FIG. 2. FIG. 2 is a flowchart illustrating a channel state information measurement method on the unlicensed band according to a first embodiment of the present disclosure. The method includes the following.

At block 201, the UE receives CQI report configuration information from a control node.

The control node may be a base station or a UE which has a control function during communication procedure. In this embodiment, an LTE-U base station is taken as an exemplary control node.

The UE may work in a CA mode according to a configuration of the base station, wherein at least one carrier is operating on the licensed band and at least one carrier is operating on the unlicensed band.

In this embodiment, the CQI report configuration information is used for indicating the UE to report a measurement result with respect to a designated occupation situation of the unlicensed band to the base station. In particular, the configuration information may include three kinds of contents, respectively corresponding to three different reporting or generating manners of the CQI report.

In a first situation, the CQI report configuration information may include CSI measurement subframe set information, to indicate a subframe set corresponding to a designated occupation situation of the unlicensed band. In one example, the indicated subframe set may be a set of subframes or a subset of the subframes in which the base station occupies the carrier on the unlicensed band wherein the base station transmits signals. Or, the indicated subframe set may be a set of subframes or a subset of the subframes in which the base station does not occupy the carrier on the unlicensed band, wherein the base station could not transmit any signal. Since it is unpredictable whether the LTE base station occupies the unlicensed band or not, the subframe set cannot be configured in advance by a determined subframe index as for the existing measurement subframe set. As described above, the CSI measurement subframe set correspond to different occupation situations of the unlicensed band. Herein, two occupation situations of the unlicensed band are provided, i.e., the base station occupies the carrier on the unlicensed band and the base station does not occupy the carrier on the unlicensed band.

In fact, when the base station does not occupy the carrier on the unlicensed band, the situation may be further divided into: another device occupies channel on the carrier, and no other device occupies the channel on the carrier. As to the situation that another device occupies the channel, there are also scenarios: there is only another control node such as another LTE-U cell of the same system, there is only a device of another system such as WiFi, and there are both other control node of the same system and device of other system, such as another LTE-U cell and WiFi. With respect to the above detailed occupation situations of the unlicensed band, there may be corresponding CSI measurement subframe sets. For example, in a practical application, the occupation situations of the unlicensed band may include the following three situations: the base station occupies the carrier on the unlicensed band, the base station does not occupy the carrier on the unlicensed band, and another system occupies the carrier on the unlicensed band. Or, it is also possible to consider merely two situations: the base station occupies the carrier on the unlicensed band and the base station does not occupy the carrier on the unlicensed band. Or, it is possible to consider the following two situations: the base occupies the carrier on the unlicensed band and another system occupies the unlicensed band. In this and subsequent embodiments of the present disclosure, any one of the above classification manners may be adopted for the classification of the carrier occupation situations (i.e. the classification of the subframe sets in this embodiment).

Table 1 shows an example of a CSI measurement subframe set configuration, wherein csi-MeasSubframeSet1-r13 and csi-MeasSubframeSet2-r13 are information of two CSI measurement subframe sets used for indicating two subframe sets. The CSI measurement subframe set information includes subframe set type information and measurement subframe set pattern information. An intersection of the resources indicated by the two kinds of information is the indicated subframe set. The measurement subframe pattern information MeasSubframePattern-r10 may be a subframe pattern with a periodicity of n ms indicated by a bitmap of n-bit length, wherein n may be a predefined natural number such as n=40. The subframe set type Subframetype-13 may be a subframe set type newly defined in the present disclosure. It may be a corresponding subframe set in which the base station occupies the carrier on the unlicensed band, or a corresponding subframe set in which the base station does not occupy the carrier on the unlicensed band, or a corresponding subframe set in which another wireless communication system occupies the unlicensed band. For example, MeasSubframePattern-r10 in csi-MeasSubframeSet1-r13 indicates that the 2~5 ms and the 15~30 ms in the 40 ms belong to the measurement subframe pattern, and Subframetype-r13 indicates the corresponding subframe set in which the base station occupies the carrier on the unlicensed band. Then, the subframe set indicated by csi-MeasSubframeSet1-r13 is an intersection between the 2~5 ms and the 15~30 ms of the 40 ms and the subframes in which the base station occupies the carrier on the unlicensed band. That is to say, if only the base station occupies the carrier on the unlicensed band during the 2~5 ms and the 15~30 ms, the subframes belong to the subframe set csi-MeasSubframeSet1-r13. For example, if the base station does not occupy the carrier on the unlicensed band during the 15~20 ms, merely the 2~5 ms and the 21~30 ms belong to the subframe set. In other words, merely the 2~5 ms and the 21~30 ms are CSI reference resource for generating the CQI report. Since it is not fixed whether the base station occupy the carrier on the unlicensed band, although MeasSubframePattern-r10 in the current and the next 40 ms periods is unchanged, the subframes belong to the subframe set have changed. If the subframe set indication contains merely Subframetype-r13 but does not contain MeasSubframePattern-r10, it indicates that the subframe set includes all subframes meeting the requirement of Subframetype-r13. For example, if the base station occupies the carrier on the unlicensed band in the 1~10 ms and the 31~39 ms, the 1~10 ms and the 31~39 ms belong to the subframe set. wherein table 1 is as follows:

TABLE 1

| | |
|---|---|
| csi-SubframePatternConfig-r13 | CHOICE { |
|     release | NULL, |
|     setup | SEQUENCE { |
|         csi-MeasSubframeSet1-r13 | { |
| | MeasSubframePattern-r10, |
| | Subframetype-r13 |
| | } |
|         csi-MeasSubframeSet2-r13 | { |
| | MeasSubframePattern-r10, |
| | Subframetype-r13 |
| | | } |
|     } | |
| } | |

In a second situation, the CQI report configuration information may include CSI process information. The CSI process information may include process type information. In one embodiment, the process may be a corresponding process when the base station occupies the carrier on the unlicensed band, or a corresponding process when the base station does to occupy the carrier on the unlicensed band, or a corresponding process when another wireless communication system occupies the unlicensed band.

Table 2 shows an example configuration of the CSI process. CSI-process-r13 is a CSI process configuration IE, wherein csi-Processtype-r13 is a process type newly added in this embodiment. For example, the value 0 denotes a process corresponding to subframes in which the base station occupies the carrier on the unlicensed band. The value 1 denotes a process corresponding to subframes in which the base station does not occupy the carrier on the unlicensed band, or a process corresponding to subframes in which another wireless communication system occupies the unlicensed band. wherein table 2 is as follows:

matrix, etc. In one embodiment, when the UE computes the CQI of the newly defined type, reference may be made to other CSI process or CSI measurement subframe set when configuring the PMI/RI/subband, e.g., it is possible to suppose that PMI/RI of CSI process #i when the base station does not occupy the carrier on the unlicensed band is the same as the PMI/RI of CSI process #j when the base station occupies the carrier on the unlicensed band, or the subbands of them are the same, etc. the base station may configure a reference CSI process or CSI measurement subframe set.

At block 202, the UE performs CSI measurement on corresponding channel measurement and interference measurement resources according to the CQI report configuration information, and transmits a CQI report to the base station.

In this block, the measurement of the interference signals may include obtaining an instant interference signal characteristic based on single interference measurement resource, or, may include obtaining short-term average interference signal characteristic based on multiple interference measurement resources. Which manner is adopted may be defined in the standards, or may be an implementation

TABLE 2

| | | | |
|---|---|---|---|
| CSI-Process-r13 ::= | SEQUENCE { | | |
|     csi-ProcessId-r11 |     CSI-ProcessId-r11 | | |
| csi-Processtype-r13 | INTERGER (0, 1) | | |
|     csi-RS-ConfigNZPId-r11 |     CSI-RS-ConfigNZPId-r11 | | |
|     csi-IM-ConfigId-r11 |     CSI-IM-ConfigId-r11 | | |
|     p-C-AndCBSRList-r11 |     SEQUENCE (SIZE (1 . .2)) OF P-C-AndCBSR-r11, | | |
|     cqi-ReportBothProc-r11 |     CQI-ReportBothProc-r11 | OPTIONAL, | -- Need OR |
|     cqi-ReportPeriodicProcId-r11 |     Integer (0..maxCQI-ProcExt-r11) | OPTIONAL, | -- Need OR |
|     cqi-ReportAperiodicProc-r11 |     CQI-ReportAperiodicProc-r11 | OPTIONAL, | -- Need OR |
| ..., | | | |
| [[    alternativeCodebookEnabledFor4TXProc-r12 | ENUMERATED {true} | OPTIONAL | -- Need OR |
| ]] | | | |
| } | | | |

In a third situation, the CQI report configuration information may include CQI reporting type. In one embodiment, the reporting type may be an existing CQI reporting type, or a newly defined CQI reporting type. At present, channel measurement value, Precoding Matrix Indicator (PMI)/Rank Indication (RI) and interference measurement value are required for computing a CQI value. The channel measurement value of the newly defined CQI reporting type is not obtained by measurement any more but is configured as a fixed value, such as 1 or 0 dB, whereas the interference measurement value is an interference value obtained by the UE on the interference measurement resource. In one example, when the UE computing the CQI of the newly defined type, the PMI/RI may be defined by the system in advance, such as RI=1, PMI is not restricted or PMI is a unit algorithm. With respect to the three different situations of the CQI report configuration information in block 201, when the CQI report is generated in this block, there are also three corresponding situations, which are described hereinafter.

In a first situation, when the CQI report configuration information includes CSI measurement subframe set information and the CSI measurement subframe set information includes subframe set type information, the UE determines whether a subframe belongs to an indicated subframe set according to a detected subframe type. If the subframe belongs to the indicated subframe set, the UE may combine a measurement result in the subframe with that in the indicated subframe set to generate the CQI report, or may generate the CQI report directly according to the measurement result in the subframe. In other words, when generating the CQI report according to the configuration information, the UE generates the CQI report according to one or more measurement results obtained in the same CSI measurement subframe set.

For example, as shown in FIG. 3a,b, the MeasSubframePattern-r10 in the csi-MeasSubframeSet1-r13 indicates that the 2~5 ms and the 15~30 ms in the 40 ms belong to the subframe set, and Subframetype-r13 indicates the subframe set in which the base station occupies the carrier on the unlicensed band. Suppose that the periodic CSI report is at the 6, 16, 26 and 36 ms (suppose that the report periodicity is 10 ms), and the CSI reference resource cannot be later than the the 2, 12, 22 and 32 ms. Suppose that the interference measurement resource is configured at the 2, 12, 22 and 32 ms (suppose that the interference measurement resource periodicity is 10 ms). As to the CQI report at the 6 ms, if the UE detects that the base station occupies the carrier on the unlicensed band at the 2 ms, the UE generates a CQI report of csiMeasSubframeSet1 based on the interference measurement result on the interference measurement resource of this subframe. If the UE detects that the base station does not occupy the carrier on the unlicensed band at the 2 ms, the UE looks for an earlier subframe in which the base station occupies the carrier on the unlicensed band, and generates the CQI report of the csi-MeasSubframeSet-1 based on such subframe. The CQI report at the 16 ms is based on the subframes belonging to the 2~5 ms and in which the base station occupies the carrier on the unlicensed band. For example, if the UE detects that the base station occupies the carrier on the unlicensed band during the 2~4 ms, but does not occupy the carrier on the unlicensed band at the 5 ms, the UE generates the CQI report of the csi-MeasSubframeSet1 according to the 2 ms, wherein the interference measurement result is obtained based on the interference measurement resource at the 2 ms. The CQI report at the 26 ms is based on at least one of subframes belonging to the 2~5 and 15~22 ms and in which the base station occupies the carrier on the unlicensed band, for example, if the UE detects that the base station occupies the carrier on the unlicensed band during the 12~14 ms and the 22 ms, the UE may generate the CQI report of the csi-MeasSubframeSet1 based on the interference measurement result obtained on the interference measurement resource in the subframes at the 22 ms, and/or 12 ms, and/or 2 ms. The CQI report at the 36 ms is based on at least one of subframes belonging to the 2~5 ms and 15~30 ms and in which the base station occupies the carrier on the unlicensed band. For example, if the UE detects that the base station occupies the carrier on the unlicensed band during the 12~14 ms, 22 ms and 30 ms, the UE may generate the CQI report of the csi-MeasSubframeSet1 based on the assumption of the subframe at the 30 ms, wherein the UE may generate the CQI report of the csi-MeasSubframeSet1 based on the interference measurement result obtained on the interference measurement resource of subframes at the 22 ms and/or 12 ms and/or 2 ms.

Since it is not fixed whether the base station occupy the carrier on the unlicensed band, although MeasSubframePattern-r10 is unchanged in the current and the next 40 ms periods, the subframes belong to the subframe set have changed. For example, in the next 40 ms period, the UE detects that the base station occupies the carrier on the unlicensed band merely during the 2 ms, the 12~14 ms and the 30 ms. Thus, when the UE reports the CQI in the 16, 26 and 36 ms, the UE may generate the CQI report of the csi-MeasSubframeSet1 according to one or more of interference measurement results obtained on the interference measurement resource at the 2 ms and 12 ms.

It can be seen from this example that, the subframe where the CSI reference resource is located may include channel measurement and/or interference measurement resource, or may not include. If the subframe includes the channel measurement and/or interference measurement resource, the measurement is performed on the channel measurement and/or interference measurement resource in the subframe. If the subframe does not include the channel measurement and/or interference measurement resource, the measurement is performed based on the channel measurement and/or interference measurement resource in a subframe of the same subframe set. For example, in this embodiment the subframe set corresponding to the intersection of MeasSubframePattern-r10 and Subframetype-r13 is adopted. For the CQI report reported at the 36 ms, the subframe where the CSI reference resource is located is the 30 ms, but the interference measurement resource is in at least one of the 22 ms, the 12 ms and the 2 ms. In subsequent embodiments, it is assumed that the subframe where the information reference resource is located includes the channel measurement and/or interference measurement resource for facilitating the description. Certainly, the practical disclosure is not restricted to this.

For another example, csi-MeasSubframeSet1-r13 includes merely Subframetype-r13, and Subframetype-r13 indicates the subframe set in which the base station occupies the carrier on the unlicensed band. Still suppose that the interference resource is at the 2, 12, 22 and 32 ms, then only when the UE detects that the base station occupies the carrier on the unlicensed band at the 2, 12, 22 and 32 ms, the UE may generate the CQI report of csi-MeasSubframeSet1 based on the interference measurement result obtained on interference measurement resource of the four subframes. If the UE merely detects that the base station occupies the carrier on the unlicensed band at the 2, 12, 32 ms, but the base station does not occupy the carrier on the unlicensed band at the 22 ms, the UE may generate the CQI report of the csi-MeasSubframeSet1 based on one or more results of the interference measurement results obtained on the interference measurement results at the 2, 12 and 32 ms.

The UE may detect whether the base station occupies a channel in the nth subframe via various manners. For example, the base station may transmit an explicit signaling to the UE, indicating whether the base station occupies the channel, and/or a channel occupy duration of the base station. For another example, the base station may transmit a scheduling signaling to the UE, indirectly informing the UE whether the base station occupies the channel. For still another example, the UE may detect, via blind measurement, signals that the base station will transmit when occupying the channel, such as CRS or preamble.

In a second situation, when the CQI report configuration information includes the CSI process information and the CSI processing information includes the process type information, the UE determines whether a process belongs to an indicated process type according to a detected process type. If the process belongs to the indicated process type, the UE may combine a measurement result of the process and a measurement result of the indicated process type to generate the CQI report, or directly generate the CQI report according to the measurement result of the process. In other words, when generating the CQI report according to the configuration information, the UE generates the CQI report of the corresponding CSI process according to one or more measurement results of CSI processes of the same type.

For example, the base station configures two processes for the UE, CSI-process 1 and CSI-process 2, wherein the csi-Processtype-r13 of CSI-process 1 indicates that the process corresponds to subframes in which the base station occupies the carrier on the unlicensed band, csi-Processtype-r13 of CSI-process 2 indicates that the process corresponds to subframes in which the base station does not occupy the carrier on the unlicensed band. Thus, the UE generates the CQI report of the CSI-process 1 based on one or more interference measurement results obtained on interference measurement resource of merely the subframes configured as the interference measurement resource and in which the base station occupies the carrier on the unlicensed band. The UE generates the CQI report of the CSI-process 2 based on one or more interference measurement results obtained on interference measurement resource of merely the subframes configured as the interference measurement resource and in which the base station does not occupy the carrier on the unlicensed band.

In a third situation, when the CQI report configuration information includes the CQI reporting type, the UE generate the corresponding CQI report according to the detected CQI reporting type. For example, if the reporting type is a newly-defined CQI type, the UE may generate the CQI report without measuring reference signals used for obtaining channel measurement or not based on the channel measurement estimated based on the reference signals, but based on a fixed channel measurement value and an interference value obtained on interference measurement resource. The channel measurement must be based on signals such as CRS transmitted by the measured target cell (or a serving cell), if the target cell does not seize the carrier on the unlicensed band, the target cell cannot transmit the signals. As such, the UE cannot perform the channel measurement. If the UE generate a measurement report based on the channel measurement obtained based on the reference signals transmitted a long time ago, the current channel quality cannot be accurately reflected. Therefore, a fixed channel measurement value may be utilized. The interference measurement may be performed when the present cell has no signal transmission, i.e., the measurement can be performed even if the present cell does not seize the carrier on the unlicensed band.

If the UE receives a reference CSI process or CSI measurement subframe set configured by the base station or defined in advance, the UE computes the CQI according to the PMI/RI and/or subband of the reference CSI process or CSI measurement subframe set.

For example, the base station configures one CSI process and two CSI measurement subframe sets for the UE, wherein Subframetype of subframe set1 indicates a subframe set in which the base station occupies the carrier on the unlicensed band, and the CQI reporting type is the existing CQI. The Subframetype of subframe set2 indicates a subframe set in which the base station does not occupy the carrier on the unlicensed band, and the CQI reporting type is the newly-defined CQI. Thus, the UE generates the CQI report of the subframe set1 based on an interference measurement result obtained on interference measurement resource of the subframes configured as the interference measurement subframe and in which the base station occupies the carrier on the unlicensed band and the channel measurement result obtained on reference signals in the subframes in which the channel measurement reference signals are transmitted and the base station occupies the carrier on the unlicensed band. The UE generates the CQI report of the subframe set2 based on an interference measurement result obtained on interference measurement resource of the subframes configured as the interference measurement subframe and in which the base station does not occupy the carrier on the unlicensed band and the channel measurement result obtained on reference signals in the subframes in which the channel measurement reference signals are transmitted and the base station does not occupy the carrier on the unlicensed band. It should be noted that, the above is merely one example. The CQI reporting type may also be utilized in a different manner from the first situation and the second situation in the first embodiment, and the present disclosure is not restricted to a particular subframe set type and/or process type in the above embodiment.

The UE transmits the CQI report to the base station. The transmission may be periodic, i.e., the report is transmitted in subframes meeting the CQI report periodicity and a time offset configured by the base station. The transmission may also be aperiodic, i.e., the report is transmitted when a trigger condition is met, e.g., when a trigger signaling indication of the base station is received.

Embodiment 2

This embodiment provides a CSI measurement method, which configures the CSI measurement resource for the UE by high layer signaling, and indicates the UE to perform CSI measurement on designated measurement resource by physical layer signaling. The method provided by this embodiment includes the following.

The UE receives CSI measurement configuration information from a control node, wherein the CSI measurement configuration information includes channel measurement and/or interference measurement resource configuration information used for indicating aperiodic channel measurement and/or interference measurement resource; and the UE performs a CSI measurement on corresponding channel measurement and/or interference measurement resource in a corresponding subframe indicated by CSI measurement configuration information, and transmits a CQI report to the control node.

FIG. 4 is a flowchart illustrating a CSI measurement method on the unlicensed band according to an embodiment of the present disclosure. The method includes the following.

At block 401, the UE receives CSI measurement configuration information from a control node.

The control node may be a base station or a UE which has a control function during communication procedure. In this embodiment, an LTE-U base station is taken as an exemplary control node.

The UE may work in a CA mode according to a configuration of the base station, wherein at least one carrier is operating on the licensed band and at least one carrier is operating on the unlicensed band.

The CSI measurement configuration information at least includes interference measurement resource configuration information. In one example, the interference measurement resource configuration information may include interference measurement resource pattern information, such as patterns in TS 36.211 Table 6.10.5.2-1 and Table 6.10.5.2-2. In one example, the information may be indicated via physical layer signaling. In order to save information bits, the patterns may be restricted to several kinds and one of the patterns may be indicated via the interference measurement configuration information. The patterns may be configured by higher layer signaling and thus the interference measurement resource configuration information may be indicated via less physical layer signaling bits. In a method for further save the information bits, there may be only one pattern and the interference measurement resource configuration information indicates whether the resource is present or not. The above three kinds of interference measurement resource configuration information may be included in physical layer signaling for indicating cell on/off, or included in physical layer signaling indicating whether the carrier on the unlicensed band is occupied by the base station, or included in physical layer signaling dedicated for indicating the interference measurement resource, or included in physical layer signaling scheduling the UE (DL assignment or UL grant). The above various kinds of signaling may be user specific, e.g., when the interference measurement resource configuration information is included in the physical layer signaling for scheduling the UE, or, the physical layer signaling dedicated for indicating the interference measurement resource indicates interference measurement resources for multiple CSI processes of one user at the same time, wherein the multiple CSI processes may belong to one or more carriers. Or, the above various signaling may be cell-specific or group-specific. For example, when the interference measurement resource configuration information is included in physical layer signaling for indicating cell on/off, or when the interference measurement resource configuration information is included in physical layer signaling indicating whether the carrier on the unlicensed band is occupied by the base station, the signaling may indicate the on/off states of multiple cells or indicate occupying states of multiple cells by the base station. Or, the signaling may be group-specific. For example, when the interference measurement resource configuration information is included in physical layer signaling dedicated for indicating the interference measurement resource, or included in the physical layer signaling indicating whether the carrier on the unlicensed band is occupied by the base station, the signaling may be with respect to multiple users in the same user group. The user group is configured by higher layer signaling transmitted by the base station and includes at least configuration of user indexes and/or cell index. Further, the above various kinds of signaling may implement the indication via a cross-carrier manner or on the same carrier. Similarly, the CSI measurement configuration information may also include the channel measurement resource configuration information. The indication of the channel measurement resource configuration information is the same as that of the interference measurement resource configuration information and is not repeated herein.

The CSI measurement configuration information may include interference measurement resource type information. For example, the interference measurement resource corresponds to a type that the control node occupies the carrier on the unlicensed band. Or preferably, the interference measurement resource corresponds to a type that the control node does not occupy the carrier on the unlicensed band or corresponds to a type that another wireless communication system occupies the carrier on the unlicensed band. The interference measurement resource type information may be configured by signaling explicitly, e.g., indicated explicitly via physical layer signaling or configured by higher layer signaling, or indicated by a combination of physical layer signaling and higher layer signaling.

The CSI measurement configuration information may also does not include the interference measurement resource type information. In this situation, the UE performs measurement on corresponding interference measurement resource in corresponding valid subframes according to a predefined time relationship between the CSI measurement configuration information and the interference measurement resource. The definition of the valid subframe is described in embodiment 5 of the present disclosure.

The channel measurement and/or the interference measurement resource indicated by the CSI measurement configuration information is aperiodic, i.e., is valid for one time. Different from existing periodic interference measurement resource, the interference measurement resource indicated by the CSI measurement configuration information is not periodic, but emerges for one or M times in merely predefined subframes, wherein M is defined in advance or signaled by higher layer. For example, the channel measurement and/or the interference measurement resource and the CSI measurement configuration information may be in the same subframe, or may be in M consecutive subframes. In addition, the base station may determine a configuring time and positions of the channel measurement and/or the interference measurement resource according to its carrier occupation situation on the unlicensed band and a carrier occupation situation corresponding to a desired measurement result (e.g., it is desired to obtain a channel quality when the unlicensed band is occupied, or, it is desired to obtain a channel quality when the unlicensed band is not occupied), so as to ensure that the CSI measurements when the base station occupies the unlicensed band and when the base station does not occupy the unlicensed band are differentiated.

At block 402, the UE performs CSI measurement on corresponding channel measurement and interference measurement resource according to the CSI measurement configuration information, and transmits a CQI report to the control node.

The UE assumes that the channel measurement and/or interference measurement resource indicated by the received CSI measurement configuration information emerges one or M times only in the predefined subframe. For example, if the UE receives the CSI measurement configuration information in subframe #n, then the UE assumes that the channel measurement and/or interference measurement resource indicated by the configuration information emerges in subframe #n. The UE may perform CSI measurement on the resource. Therefore, the CSI measurement configuration information may be regarded as indication information of the aperiodic transmission of the channel measurement and/or interference measurement resource by the base station, or may be regarded as indication information of aperiodic channel measurement and/or interference measurement of the UE. If the CSI measurement configuration information includes the indication information of aperiodic channel measurement and/or interference measurement resource transmitted by the base station, the UE is not restricted to perform the measurement on the indicated channel measurement and/or interference measurement resource. The UE merely needs to determine whether it is required to perform the measurement on corresponding resources according to a practical situation and ensure that the CQI report is not affected. However, the UE may need to perform a rating matching on the corresponding resources. For example, as defined in existing standards, the UE needs to perform the rate matching to the configured NZP CSI-RS and ZP CSI-RS and CRS. The UE may also perform the rate matching according to other methods, e.g., the method described in embodiment 3. If the CSI measurement configuration information includes indication information indicating the UE to perform aperiodic channel measurement and/or interference measurement, the UE must perform the CSI measurement on all resources and makes preparations for subsequent CQI report. The rate matching method is similar as above. Herein, the channel measurement resource may be configured according to an existing method, or according to a new method. For example, a new CSI-RS time-frequency pattern or code resource or power resource may be introduced. At this time, the CSI reference signal configuration in existing standard 36. 211 Table 6.10.5.2-1 needs to be extended or modified.

If the CSI obtained based on single channel measurement and/or interference measurement resource is inaccurate, multiple measurement results may be combined to improve the accuracy. If the UE needs to combine multiple CSI measurement results, merely the CSI measurement results with the same configuration can be combined. For example, CSI measurement results with the same measurement resource type may be combined, i.e., CSI measurement results obtained when the base station occupies the unlicensed carrier can be combined, and CSI measurement results obtained when the base station does not occupy the unlicensed carrier can also be combined, but the CSI measurement results respectively obtained in the above two situations cannot be combined, i.e., the CSI measurement results under the same interference measurement resource configuration can be combined, but the CSI measurement results under different interference measurement resource configurations cannot be combined.

The CSI measurement configuration information and the reporting of the UE may be independent in this embodiment. For example, the CSI measurement configuration information merely indicates aperiodic channel measurement and/or interference measurement resource transmitted by the base station, but the UE may perform measurement based on the indicated resource and report the CQI periodically. For an example, the UE receives the CSI measurement configuration information in subframe #n. The UE performs measurement on the channel measurement and/or interference measurement resource of subframe #n and generates the CQI report. The UE reports the CQI report to the base station periodically in subframe #m. For another example, the CSI measurement configuration information and the aperiodic CSI report request are indicated via independent signaling respectively.

The CSI measurement configuration information and the reporting action of the UE may also be associated with each other in this embodiment. For example, the CSI measurement configuration information not only indicates aperiodic channel measurement and/or interference measurement resource transmitted by the base station on which the UE may perform measurement, but also implicitly indicates the UE to report aperiodic CSI. For example, the UE receives the CSI measurement configuration information in subframe #n. Thus the UE assumes that the indicated channel measurement and/or interference measurement resource indicated by the configuration information emerge in subframe #n. The UE performs measurement on the channel measurement and/or interference measurement resources of subframe #n, generates a CQI report and perform CSI reporting to the base station in subframe #n+4.

Embodiment 3

This embodiment provides a CSI measurement method, in which the carrier occupation situation of the control node on the unlicensed band is detected by UE, and CSI measurement is performed based on the carrier occupation situation without additional signaling to indicate the CSI measurement resource.

FIG. 5 is a flowchart illustrating a CSI measurement method on the unlicensed carrier according to an embodiment of the present disclosure. The method includes the following.

At block 501, the UE detects a carrier occupation situation on an unlicensed band.

The UE detects whether a serving base station occupies a carrier on the unlicensed band. The UE may detect whether the base station occupies channel in the $n^{th}$ subframe via various manners. For example, the base station may transmit explicit signaling to the UE to indicate whether the base station occupies the channel, and/or indicate a channel occupancy duration. For another example, the base station may transmit scheduling signaling to the UE, to inform the UE whether the base station occupies the channel indirectly. For still another example, the UE may detect, via blind measurement, signals such as CRS or preamble that the base station transmits when occupying the channel.

At block 502, the UE performs a CSI measurement on the corresponding channel measurement and/or interference measurement resource according to the detected carrier occupation situation of the base station on the unlicensed carrier, and transmits a CQI report to the control node.

If the UE detects that the base station occupies the carrier on the unlicensed band, the UE may perform the CSI measurement on the predefined channel measurement and/or interference measurement resource. For example, it is possible for the UE to assume that the channel measurement and/or interference measurement resource is in the first subframe in which the base station occupies the unlicensed band. For example, it is possible for the UE to assume that the channel measurement and/or interference measurement resource is on a predefined position of a subframe in which the reference signal before the data burst (such as preamble) is transmitted. If the length of the first subframe or the subframe in which the preamble is transmitted is not enough for mapping the predefined channel measurement and/or interference measurement resource, the UE may perform the CSI measurement on predefined channel measurement and/or interference measurement resource in a next subframe. For example, the length of the first subframe is 1 OFDM symbol, whereas the channel measurement resource and/or interference measurement resource needs to occupy 2 OFDM symbols, or the length of the first subframe is 3 OFDM symbols, i.e., OFDM symbols with indexes 11~13, but the predefined channel measurement resource and interference measurement resource is in the OFDM symbols with indexes 9~10, the UE performs the CSI measurement on the predefined channel measurement and interference measurement resource of the second subframe.

If the UE detects that the base station does not occupy the carrier on the unlicensed band or detects that another system occupies the carrier on the unlicensed band, the UE may adopt an existing CSI measurement manner which is not restricted in the present disclosure. If the UE needs to combine multiple CSI measurement results, merely the CSI measurement results generated via the same manner can be combined, i.e., the CSI measurement results obtained when the base station occupies the carrier on the unlicensed band can be combined, and the CSI measurement results obtained when the base station does not occupy the carrier on the unlicensed band can also be combined, but the CSI measurement results obtained under different situations cannot be combined.

If there is data transmission in the subframe where the predefined channel measurement and/or interference measurement resource may be present, the data transmission has to avoid mapping to the channel measurement and/or interference measurement resource via a rate matching or punching manner. When receiving the data, the UE may receive the data according to the predefined channel measurement and interference measurement resource and the predefined rate matching or punching manner. Or when receiving the data, the UE may receive the data according to the resource indicated by the base station and the predefined rate matching or punching manner, e.g., the downlink control information (DCI) received by the UE from the base station may include a pattern of rate matching, e.g. something like 'PDSCH RE Mapping and Quasi-Co-Location Indicator' defined for transmission mode 10, or the pattern of the rate matching may be indicated by a newly-defined bit. For the newly-defined bit, it may be adopted for the DCI in the UE-specific search space. It may be configured by higher layer signaling whether the new bit is enabled. For example, the bit for indicating the pattern of the rate matching is enabled only when the base station configures to use the bit. The higher layer signaling may be user specific or cell specific or group specific. The channel measurement and interference measurement resource indicated by the base station may be indicated via physical layer signaling, or MAC layer signaling, or RRC higher layer signaling. The predefined resource or the resource indicated by the base station may be a set of channel measurement and interference measurement resource actually transmitted, or a superset of the channel measurement and interference measurement resource actually transmitted. It should be noted that, the indication for performing the rate matching is not equivalent to the indication for performing the CSI measurement. For example, for a UE not supporting NZP/ZP CSI-RS based CSI measurement or not supporting aperiodic CSI measurement, if the cell supports transmission of the predefined channel measurement and interference measurement resource, the UE performs rate matching or punching according to the predefined channel measurement and interference measurement resource, even if the UE does not perform CSI measurement based on such resource.

The UE may periodically feedback CQI to the base station, i.e., report in the instance satisfying CQI report periodicity and a time offset configured by the base station. Or, UE may aperiodically feedback CQI For example, the UE may report in the $(n+m)^{th}$ subframe after subframe n in which the UE detects that the base station occupies the channel. For example, after the base station passes a CCA, the base station occupies the channel thus transmit signals in subframe #n. The UE performs CSI measurement on predefined resource of subframe #n, and transmits a report to the base station in subframe #n+4. The aperiodic report may also be event triggered. For example, the UE transmits the report if, and only if, a last CQI report of the same type is earlier than a predefined time. For example, after performing a CCA, the base station occupies the channel in subframe #n. If and only if the time of the last CQI report of the same type subframe #m meets n-m>T1, the UE performs CSI measurement on the predefined resource of subframe #n, and transmits a report to the base station in subframe #n+4.

Embodiment 4

In the CSI measurement method provided by this embodiment, it is possible to define valid downlink subframes via a predefined manner (e.g. defined in protocol), and perform measurement combining the manners of the above embodiments 1, 2 or 3, such that the CSI measurement can be performed even when the control node does not occupy the unlicensed band or another system occupies the unlicensed band, and measurement results obtained when the control node occupies and not occupy the unlicensed band can be differentiated.

FIG. 6 is a flowchart illustrating a CSI measurement method on the unlicensed band according to an embodiment of the present disclosure. A combination with embodiment 1 is taken as an example. The method includes the following.

At block 601, the UE receives CSI configuration information, which includes CSI reference signal and/or CSI interference measurement resource from a control node;

the UE receives CQI report configuration information from the control node.

The configuration information of the CSI reference signal (channel measurement resource as in embodiment 1~3) and/or CSI interference measurement resource includes at least periodicities, time offset and patterns of the CSI reference signal and/or CSI interference measurement resource. Similarly, CSI reference signals that the channel measurement is based on may be existing CRS, CSI-RS or newly-defined signals, e.g., preamble. The CSI interference measurement resource may be existing CRS, IMR or newly-defined resources.

The CQI report configuration information includes at least one situation in the embodiment 1, i.e., includes the CSI measurement subframe set information and subframe set type information, or includes CSI process information and process type information, or includes CQI reporting type.

At block 602, the UE determines whether a subframe where the CSI reference signal and/or the CSI interference measurement resource indicated by the configuration information is located is a valid downlink subframe. If yes, the method proceeds to block 603; otherwise, the method proceeds to block 604.

The UE needs to determine whether the subframe where the CSI reference signal and/or the CSI interference measurement resource indicated by the configuration information is located is a valid downlink subframe. Considering that the resource indicated by the configuration information may be periodic resource, during the determination, determine toward earlier subframes from subframe $n-n_{CQI\_ref}$ or a most recent subframe before subframe $n-n_{CQI\_ref}$ where the resource indicated by the configuration information is located whether each subframe where the indicated resource is located is a valid downlink subframe, i.e., search subframes before subframe $n-n_{CQI\_ref}$ for a most recent subframe where the indicated resource is located, and take the found subframe as a start point, determine toward earlier subframes from the found subframe whether each subframe where the indicated resource is located is a valid downlink subframe in turn, until a valid downlink subframe is found.

In an existing LTE system, for a FDD system, each subframe on the downlink carrier may be regarded as a downlink subframe. Except for the subframes configured as measurement gap, all of the other downlink subframes may be used for downlink transmission. For a TDD system, however, the uplink and the downlink are on the same carrier. The system configures downlink subframes, uplink subframes and special subframe on this carrier. Except for the subframes configured as measurement gap, the uplink subframes and the special subframe under a special configuration, other subframes configured as downlink subframes may be used for downlink transmission. On the unlicensed band, for the FDD system, besides the subframes configured as the measurement gap, there may be other subframes cannot be used for downlink transmission, e.g., idle period, or subframes used for transmitting uplink signals (may be not uplink data but merely uplink signals used for assisting downlink transmission). As shown in FIG. 7, it is possible that a part of one subframe cannot be used for transmitting downlink signals and another part of the subframe can be used for transmitting downlink signals. For example, first x OFDM symbols of a subframe belong to the idle period, and the remaining part may be used for downlink transmission. In this situation, this subframe may be regarded as a subframe can be used for downlink transmission. Or, it is possible to determine whether this subframe is a subframe can be used for downlink transmission according to a predefined rule. For example, if the idle period accounts for less than y %, the subframe may be regarded as a subframe can be used for downlink transmission, otherwise, the subframe is regarded as a subframe cannot be used for downlink transmission. Hereinafter, two special cases are given. If y is configured as 0, if only the subframe includes idle period, the subframe is determined as a subframe cannot be used for downlink transmission. If y is configured as 100, whether the subframe includes idle period or not, the subframe is determined as a subframe can be used for downlink transmission.

Based on the above understanding of the subframe can be used for downlink transmission, if the subframe where the CSI reference signal and/or the CSI interference measurement resource indicated by the configuration information is located is one of subframes can be used for downlink transmission on the downlink carrier or is one of subframes can be used for downlink transmission configured by the system, and meets the requirement in TS 36.213 7.2.3, the downlink subframe is regarded as a valid downlink carrier, which is irrelevant to whether the base station occupies the corresponding carrier on the unlicensed band in this downlink subframe. Further, for one subframe, if the base station occupies the carrier on the unlicensed band in a part of the subframe but does not occupy the carrier on the unlicensed band in the remaining part of the subframe, the subframe may also be regarded as a valid downlink subframe if the subframe meets following requirements. Hereinafter, the requirements for the subframe defined in TS 36.213 7.2.3 are given.

it is configured as a downlink subframe or a special subframe for that UE, and
in case multiple cells with different uplink-downlink configurations are aggregated and the UE is not capable of simultaneous reception and transmission in the aggregated cells, the subframe in the primary cell is a downlink subframe or a special subframe with the length of DwPTS more than $7680 \times T_s$, and
except for transmission mode 9 or 10, it is not an MBSFN subframe, and
it does not contain a DwPTS field in case the length of DwPTS is $7680 \times T_s$ and less, and
it does not fall within a configured measurement gap for that UE, and
for periodic CSI reporting, it is an element of the CSI subframe set linked to the periodic CSI report when that UE is configured with CSI subframe sets, and
for a UE configured in transmission mode 10 with multiple configured CSI processes, and aperiodic CSI reporting for a CSI process, it is an element of the CSI subframe set linked to the downlink subframe with the corresponding CSI request in an uplink DCI format, when that UE is configured with CSI subframe sets for the CSI process.

At block 603, the UE performs CSI measurement in the valid downlink subframe according to the received configuration information, and transmits a CQI report to the control node.

The UE performs the CSI measurement in the valid downlink subframe according to at least one situation in embodiment 1, and transmits the CQI report to the control node. In block 601, the CSI reference signal and/or CSI interference measurement resource are indicated. In this block, the CSI measurement may be performed on the CSI reference signal and/or CSI interference measurement resource. For example, if merely the CSI interference measurement resource is indicated in block 601, the CSI measurement may be performed on the indicated interference measurement resource and channel measurement resource indicated by another manner in this block.

At block 604, the UE does not perform measurement on the CSI reference signal and/or CSI interference measurement resource in an invalid downlink subframe.

If it is determined that a subframe where the indicated resource is located is not an valid downlink subframe, it is further determined whether a last subframe where the indicated resource is located is a valid downlink subframe and a corresponding processing is performed, until a valid downlink subframe is found. The CQI is computed according to the most recent valid downlink subframe and the CQI is reported to the control node.

Embodiment 5

In the CSI measurement method provided by this embodiment, a valid downlink subframe is defined for CSI measurement. The valid downlink subframe only includes a part in which the control node occupies the carrier on the unlicensed band. That is to say, in the method of this embodiment, the CSI measurement is performed merely with respect to the situation that the control node occupies the carrier on the unlicensed band, so as to avoid the measurement when the control node does not occupy the unlicensed band. In other words, the CSI measurement, i.e. CSI channel and/or CSI interference measurement is not performed outside of the control node transmission periods.

FIG. 8 is a flowchart illustrating a CSI measurement method on the unlicensed band according to an embodiment of the present disclosure. The method includes the following.

At block 801, the UE receives CSI configuration information, which includes CSI reference signal and/or CSI interference measurement resource from a control node.

At block 802, the UE determines whether a subframe where the CSI reference signal and/or CSI interference measurement resource indicated by the configuration information is located is a valid downlink subframe. If yes, the method proceeds to block 803; otherwise, the method proceeds to block 804.

The UE needs to determine whether the subframe where the CSI reference signal and/or the CSI interference measurement resource indicated by the configuration information is located is a valid downlink subframe. Similarly as embodiment 4, considering that the resource indicated by the configuration information may be periodic resource, during the determination, it is determined toward earlier subframes from subframe $n-n_{CQI\_ref}$ or a most recent subframe where the resource indicated by the configuration information is located before subframe $n-n_{CQI\_ref}$ whether each subframe where the indicated resource is located is a valid downlink subframe. The method for determining whether a subframe is a valid downlink subframe is as follows.

(1) If the base station does not occupy the carrier on the unlicensed band in the downlink subframe, the downlink subframe is not a valid downlink subframe.

(2) If the base station occupies the carrier on the unlicensed band in all part of the downlink subframe, the downlink subframe is a valid downlink subframe.

(3) For one subframe, if the base station occupies the carrier on the unlicensed band in a part of the subframe but does not occupy the carrier on the unlicensed band in the remaining part, the subframe may be regarded as a valid downlink subframe if all or more than a predefined proportion of the CSI reference signal and/or CSI interference measurement resource is located in the part in which the base station occupies the carrier on the unlicensed band.

If (2) or (3) is met, and if the subframe meets the requirements defined in TS 36.213 7.2.3, the subframe is regarded as a valid downlink subframe. Otherwise, the subframe is not regarded as a valid downlink subframe.

It should be noted that, all of the CSI reference signal and/or CSI interference measurement resource is within the part of the subframe in which the base station occupies the carrier on the unlicensed band may include two situations: (1) all of the CSI interference measurement resource is within the part of the subframe in which the base station occupies the carrier on the unlicensed band, whether or not the CSI channel measurement resource is within the part of the subframe in which the base station occupies the carrier on the unlicensed band, the downlink subframe is regarded as a valid downlink subframe; Because in some region, the CSI channel measurement resource may be allowed to be transmitted without LBT while data transmission should be based on LBT. The channel part may be the same when the channel is occupied by other nodes or not. However, the interference could be quite different when the channel is occupied by the base station or by other nodes. Thus, it is beneficial to restrict that the downlink subframe is regarded as a valid downlink subframe if all of the CSI interference measurement resource is within the part of the subframe in which the base station occupies the carrier on the unlicensed band. (2) both the CSI interference measurement resource and the CSI channel measurement resource are located in the part of the subframe in which the base station occupies the carrier on the unlicensed band, the downlink subframe is regarded as a valid downlink subframe. FIG. 9 shows the second situation. The predefined proportion may be configured according to a practical requirement. As shown in FIG. 9, if the base station occupies the carrier on the unlicensed band in all part of the downlink subframe, the downlink subframe is a valid downlink subframe.

At block 803, the UE performs a CSI measurement in the valid downlink subframe according to the received configuration information, and feedback a CQI report.

At block 804, the UE does not perform measurement on the CSI reference signal and/or CSI interference measurement resource in an invalid downlink subframe.

If it is determined that a subframe where the indicated resource is located is not a valid downlink subframe, it is further determined whether a last subframe where the indicated resource is located is a valid downlink subframe and a corresponding processing is performed, until a valid downlink subframe is found. The CQI is computed according to the most recent valid downlink subframe and the CQI is reported to the control node.

Through this method, the CQI report transmitted by the UE may reflect merely the channel quality when the base station occupies the carrier on the unlicensed band.

Embodiment 6

In the CSI measurement method provided by this embodiment, it is possible to define a valid downlink subframe via a predefined manner (e.g. defined by a protocol) and perform the CSI measurement in the valid downlink subframe, such that the CSI when the control node does not occupy the unlicensed band or another system occupies the unlicensed band may be obtained.

FIG. 10 is a flowchart illustrating a CSI measurement method according to an embodiment of the present disclosure. Before performing the CSI measurement, the UE needs to search subframes prior to subframe n in which the CQI report is fed back in turn for a subframe can be used for generating a CQI report, i.e., search for a valid downlink subframe (hereinafter referred to as a first valid downlink subframe) of the CSI reference resource. This embodiment provides a determining procedure with respect to any subframe, and assumes that the measurement resource may be not in the same valid downlink subframe of the CSI reference resource. As shown in FIG. 10, the method includes the following.

At block 1001, the UE determines whether a current subframe m is a valid downlink subframe. If yes, it is taken as the first valid downlink subframe and the method proceeds to block 1002; otherwise, the method proceeds to block 1003.

On the unlicensed band, for the FDD system, besides the subframes configured as the measurement gap, there may be other subframes cannot be used for downlink transmission, e.g., idle period, or subframes used for transmitting uplink signals (may be not uplink data but merely uplink signals used for assisting downlink transmission). As shown in FIG. 10, it is possible that a part of one subframe cannot be used for transmitting downlink signals and another part of the subframe can be used for transmitting downlink signals. For example, first x OFDM symbols of a subframe belong to the idle period, and the remaining part may be used for downlink transmission. In this situation, this subframe may be regarded as a subframe can be used for downlink transmission. Or, it is possible to determine whether this subframe is a subframe can be used for downlink transmission according to a predefined rule. For example, if the idle period accounts for less than y %, the subframe may be regarded as a subframe can be used for downlink transmission, otherwise, the subframe is regarded as a subframe cannot be used for downlink transmission. Hereinafter, two special cases are given. If y is configured as 0, if the subframe includes any idle period, the subframe is determined as a subframe cannot be used for downlink transmission. If y is configured as 100, whether the subframe includes idle period or not, the subframe is determined as a subframe can be used for downlink transmission.

Suppose that the subframe in which the CQI report is transmitted is subframe n, it is determined whether subframe $m=n-n_{CQI\_ref}$ is one of subframes can be used for downlink transmission or one of all subframes can be used for downlink transmission configured by the system and whether the requirements defined in TS 36.213 7.2.3 (as described in embodiment 4) are met. If yes, the subframe is a valid downlink subframe and is taken as a CSI reference resource downlink subframe, which is irrelevant to whether the base station occupies the corresponding carrier on the unlicensed band in the downlink subframe. In one subframe, if the base station occupies the carrier on the unlicensed band in a part of the subframe but does not occupy the carrier on the unlicensed band on the remaining part of the subframe, the subframe may also be regarded as a valid downlink carrier if the subframe meets the above requirements, and is taken as a CSI reference downlink subframe (i.e., first valid downlink subframe).

At block 1002, the UE computes the CQI according to the first valid downlink subframe, and transmits a CQI report to the control node.

The first valid downlink subframe is taken as CSI reference resource subframe for generating the CQI report. It is noted that the measurement resource may be not in the first valid downlink subframe. Certainly, if the measurement resource is in the first valid downlink subframe, the CSI measurement is performed on the measurement resource of the first valid downlink subframe to generate the CQI report. Otherwise, CSI measurement and CQI computation is based on different valid downlink subframes.

At block 1003, the UE does not generate the CQI report according to the current subframe m.

If it is determined that the current subframe m is not a valid downlink subframe, it is determined whether a former subframe of the current subframe is a valid downlink subframe and a corresponding processing is performed, until a valid downlink subframe is found. The found valid downlink subframe is taken as the first valid downlink subframe. The CQI is calculated according to a most recent valid downlink subframe prior to subframe m, and the CQI report is transmitted to the control node. The difference between this embodiment and embodiment 4 relies in, this embodiment does not require the CSI reference resource valid downlink subframe for computing the CQI includes the CSI measurement and/or interference measurement resource. But the UE still needs to perform a channel measurement and interference measurement based on corresponding channel measurement and/or interference measurement resource according to the method described in embodiment 4, i.e., search for a valid downlink subframe used for performing CSI measurement (i.e., a second valid downlink subframe) according to the method of embodiment 4, performs a CSI measurement according to the found second valid downlink subframe, and computes the CQI based on the first valid downlink subframe determined in block 1001.

Embodiment 7

The CSI measurement method provided by this embodiment corresponds to the method of embodiment 5, including the process of receiving CSI reference signal configuration information and/or CSI interference resource configuration information from the control node. The difference relies in, the method of this embodiment does not require the CSI reference resource valid downlink subframe used for computing the CQI must include CSI measurement and/or interference measurement resource, but the UE still shall perform the CSI measurement based on CSI measurement and/or interference measurement resource in a subframe where the control node occupies the channel according to the method described in embodiment 5, i.e., the subframe where the CSI measurement resource is located is a valid downlink subframe meeting the requirement of (2) or (3) in embodiment 5, and then the CQI is computed based on the determination on whether the subframe where the CSI reference resource is located is a valid subframe in block 1101.

FIG. 11 is a flowchart illustrating a CSI measurement method according to an embodiment of the present disclosure. As shown in FIG. 11, the method includes the following.

At block 1101, the UE determines whether a downlink subframe m is a valid downlink subframe. If yes, it is taken as a first valid downlink subframe and the method proceeds to block 1102; otherwise, the method proceeds to block 1103.

Suppose that the CQI is reported in subframe n, when determining whether the downlink subframe $m=n-n_{CQI\_ref}$ is a valid downlink subframe, (1) if the base station does not occupy the carrier on the unlicensed band in subframe m, the subframe m is not a valid downlink subframe.

(2) If the base station occupies the carrier on the unlicensed band in all part of the downlink subframe, the downlink subframe may be a valid downlink subframe.

(3) In the subframe m, if the base station occupies the carrier on the unlicensed band in a part of the subframe but does not occupy the carrier on the unlicensed band in the remaining part of the subframe, the subframe m may be regarded as a valid downlink subframe if the portion in which the base station occupies the carrier on the unlicensed band accounts for more than a predefined proportion. The predefined proportion may be predefined, or configured by higher layer, which may be configured according to a practical requirement. The determination herein is slightly different from that in situation (3) of embodiment 5, but the idea is the same. Therefore, it may be regarded that the two determinations are the same.

If (2) or (3) is met, and the subframe meets the requirements defined in TS 36.213 7.2.3, the subframe is a valid downlink subframe; otherwise, the subframe is not a valid downlink subframe.

If the part in which the base station occupies the carrier on the unlicensed band accounts for more than a predefined proportion, the part of the subframe in which the base station occupies the carrier on the unlicensed band may be a part from the beginning of the subframe. For example, the base station may occupy the channel from the first OFDM symbol to the seventh OFDM symbol of the first subframe. Or, the part of the subframe in which the base station occupies the carrier on the unlicensed band may be a part from middle of the subframe to the end of the subframe. For example, the base station occupies the channel from the eighth OFDM symbol to the 14th OFDM symbol of the last subframe.

If the part in which the base station occupies the carrier on the unlicensed band accounts for more than a predefined proportion, the configuration of the proportion may refer to the CRS resource used for the CSI measurement. For example, based on the existing CRS structure, the base station needs to occupy the carrier on the unlicensed band in at least 5 OFDM symbols in order to include 2 CRS OFDM symbols, i.e., the proportion is 5/14. Or, the base station needs to occupy the carrier on the unlicensed band in at least 7 OFDM symbols, i.e., the proportion is 7/14. Similarly, for a new CRS structure, suppose that the base station needs to occupy the carrier on the unlicensed band in M consecutive OFDM symbols in order to include CRS symbols required for a CSI measurement accuracy, the proportion is M/N, wherein N denotes the total number of OFDM symbols in one subframe. It should be noted that, the proportion may be different for the first subframe and the last subframe in which the base station occupies the channel. Preferably, a uniform proportion is configured without differentiating the two situations. Or preferably, different proportions are configured with respect to different situations. In addition, the proportion is also relevant to whether the base station transmits other preambles before occupying the channel for transmitting data. For example, the proportions respectively configured for a situation that the base station transmits reference signal used for synchronization before occupying the channel for transmitting data and a situation that the base station does not transmit reference signal for synchronization before occupying the channel for transmitting data may be different. Preferably, a uniform proportion may be configured without differentiating the two situations. Or, different proportions may be configured with respect to different situations.

At block 1102, CQI is computed according to the portion of the first valid downlink subframe in which the base station occupies the carrier on the unlicensed band, and a CQI report is transmitted to the control node.

When computing the CSI and generating the CQI report, if the first valid downlink subframe does not contain the channel measurement and/or interference measurement resource, i.e., the first valid downlink subframe is not a subframe where the resource indicated by the CSI reference signal configuration information and/or CSI interference measurement resource configuration information transmitted by the control node is located, it is required to determine toward earlier subframes from the first valid downlink subframe whether each subframe where the resource indicated by the CSI reference signal configuration information and/or CSI interference measurement resource configuration information is located is a valid downlink subframe, until a valid downlink subframe is found. The found valid downlink subframe is taken as a second valid downlink subframe. The CSI measurement is performed in the second valid downlink subframe, and CQI report is generated according to the first valid downlink subframe (i.e. the CSI reference resource used for computing the CQI). If the first valid downlink subframe contains the channel measurement and/or interference measurement resource, i.e., the first valid downlink subframe is a subframe where the resource indicated by the CSI reference signal configuration information and/or CSI interference measurement resource configuration information transmitted by the control node is located, the CSI measurement is performed directly in the part of the first valid downlink subframe in which the carrier on the unlicensed band is occupied, the CSI is computed and the CQI report is generated.

At block 1103, the UE does not generate the CQI report according to the current subframe m.

If it is determined that the current subframe m is not a valid downlink subframe, it is determined whether a former subframe of the current subframe is a valid downlink subframe and a corresponding processing is performed, until a valid downlink subframe is found. The CQI is computed according to a most recent valid downlink subframe prior to subframe m, and the CQI report is transmitted to the control node.

FIG. 12 shows two examples according to this embodiment of the present disclosure. Suppose that the CQI is configured to be reported in subframes n=6, 16, . . . 36. Thus, the CSI reference resource subframes m=n-$n_{CQI\_ref}$ for computing the CQI are subframes 2, 12, 32, wherein the base station occupies the carrier on the unlicensed band in subframes 2 and 12, and subframes 2 and 12 contain the CSI reference signal/CSI interference measurement resource. Therefore, the CQI reported in subframes 6 and 16 may be computed based on the measurement result on the CSI reference signal/CSI interference measurement resource in the subframes 2 and 12. However, the base station does not occupy the carrier on the unlicensed band in subframe 32. Therefore, subframe 32 cannot be taken as a valid CSI reference resource subframe and cannot be taken as a valid CSI measurement subframe. At this time, search backward and find a most recent valid downlink subframe 30. The valid downlink subframe 30 is taken as the CSI reference resource subframe. This CSI reference resource subframe does not contain the CSI reference signal/CSI interference measurement resource. Therefore, the UE performs the CSI measurement according to a most recent valid downlink subframe which is before subframe 30 and contain the CSI reference signal/CSI interference measurement resource, i.e., subframe 18, and computes the CQI according to the subframe 30. For another example, suppose that the CQI is configured to be reported in subframes n=7, 17, . . . 37, wherein the base station occupies the channel in subframes 3, 13 and 33. Therefore, all of them are valid downlink subframes and are valid CSI reference resource subframes. The corresponding CSI measurement valid subframes are respectively subframes 2, 12, 18.

Embodiment 8

The CSI measurement method in this embodiment differs from the method in embodiments 4-6 and 7 in that, in embodiments 4-6 and 7, the determining method of the CSI reference resource valid downlink subframe (i.e., the first valid downlink subframe) for computing the CQI is the same as the determining method of the CSI reference signal/CSI interference measurement resource valid downlink subframe (i.e., the second valid downlink subframe) for performing the CSI measurement; but in this embodiment, the determining method of the CSI reference resource valid downlink subframe for computing the CQI is different from the determining method of the CSI reference signal/CSI interference measurement resource valid downlink subframe for performing the CSI measurement. For example, the CSI reference resource valid downlink subframe for computing the CQI may be determined according to the prior art or according to the method in embodiment 4, which is irrelevant to whether the base station occupies the carrier on the unlicensed band. But the CSI reference signal/CSI interference measurement valid downlink subframe for performing the CSI measurement may be determined according to the situation (2) or (3) in embodiment 5 and the definition of valid subframe in TS 36.213 7.2.3.

It should be noted that, the valid CSI reference resource subframe and CSI reference signal/CSI interference measurement resource are described in form of valid subframes in embodiments 4-8. However, they may also be described in other forms, so as to determine the valid CSI reference resource subframe and the CSI reference signal/CSI interference measurement resource.

The above describes the CSI measurement method provided by the present disclosure. In accordance with the measurement method, the present disclosure further provides a CSI measurement UE, applicable for implementing the above method. The UE provided by the present disclosure may operate in a carrier aggregation mode or a dual connectivity mode, wherein the aggregated carriers at least include a carrier on the licensed band a carrier on the unlicensed band.

The UE provided by an embodiment of the present disclosure includes: a receiving unit, a measurement unit and a reporting unit. The receiving unit is adapted to receive resource indication information for performing a CSI measurement. The measurement unit is adapted to perform a CSI measurement according to the resource indication information. The reporting unit is adapted to report a CQI report to a control node.

In accordance with embodiment 1, the UE provided by the embodiment of the present disclosure further includes: a configuration information receiving unit is adapted to receive a CQI report configuration information transmitted by the control node, wherein the CQI report configuration information is used for indicating the UE to report the CQI corresponding to a designated carrier occupation situation of the control node on the unlicensed band to the control node. The designated carrier occupation situation includes the control node occupies the carrier on the unlicensed band or the control node does not occupy the carrier on the unlicensed band. The measurement unit is adapted to perform the CSI measurement. The reporting unit is adapted to feed back a CQI report generated according to a CSI measurement result and the configuration information to the control node.

Further, the configuration information includes CSI measurement subframe set information. The CSI measurement subframe set is a set of subframes or a subset of the subframes in which the control node occupies the carrier on the unlicensed band, or a set of subframes or a subset of the subframes in which the control node does not occupy the carrier on the unlicensed band. The measurement unit generates the CQI report according to one or more measurement results obtained on the same CSI measurement subframe set.

In particular, the CSI measurement subframe set information includes: subframe set type information, and, a subframe pattern with a periodicity of n ms indicated by a bitmap. The subframe set indicated by the CSI measurement subframe set information includes: an intersection between the subframe set indicated by the type information and the subframe set indicated by the subframe pattern, wherein the subframe set type information is used for indicating a subframe set in which the control node occupies the carrier on the unlicensed band, or a subframe set in which the control node does not occupy the carrier on the unlicensed band.

Or, the CSI measurement subframe set information includes: subframe set type information; the subframe set indicated by the CSI measurement subframe set information is a subframe set indicated by the type information.

Or, the configuration information in embodiment 1 further includes CSI process information, used for indicating a process in which the control node occupies the carrier on the unlicensed band, or a process in which the control node does not occupy the carrier on the unlicensed band. The measurement unit is adapted to generate the CQI report of the CSI process according to one or more measurement results of the same type of CSI process.

Or, the configuration information in embodiment 1 may further include CQI reporting type, wherein the CQI reporting type may be an existing reporting type or a self-defined reporting type. The measurement unit is adapted to generate the CQI report according to a predefined channel measurement value and an interference value obtained on the interference measurement resource when the CQI reporting type is the self-defined reporting type. Further, if the CQI reporting type is the self-defined reporting type, the measurement unit may further generate the CQI according to predefined RI and PMI, or generate the CQI according to the RI and PMI of the reference CSI process or CSI measurement subframe set configured by the control node. When the control node does not occupy the carrier on the unlicensed band, the control node may configure the CQI reporting type as the self-defined reporting type.

In accordance with embodiment 2, the UE provided by the embodiment of the present disclosure further includes: a receiving unit, adapted to receive CSI measurement configuration information transmitted by the control node. The CSI measurement configuration information includes channel measurement and/or interference measurement resource configuration information, used for indicating aperiodic interference measurement resource. The measurement unit is adapted to perform the CSI measurement on the interference measurement resource indicated by the interference measurement resource configuration information in the corresponding subframe. The reporting unit is adapted to feed back a CQI report to the control node.

Further, the interference measurement resource configuration information in embodiment 2 may further include channel measurement and/or interference measurement resource pattern information. The channel measurement and/or interference measurement resource pattern information may be: indication information of one of N predefined patterns, or indication information of one of N patterns configured by higher layer, or indication information indicating whether one predefined pattern is present. In particular, the interference measurement pattern information may be included in physical layer signaling for indicating cell on/off, or included in physical signaling for indicating whether the carrier on the unlicensed band is occupied by the control node, or included in the physical signaling indicating whether the carrier on the unlicensed band is occupied by a wireless communication system other than a system where the UE is located, or included in physical layer signaling dedicated for indicating the channel measurement and/or interference measurement resource, or included in physical signaling for scheduling the UE.

Or, the CSI measurement configuration information in embodiment 2 may further include type information of the interference measurement resource, used for indicating that the interference measurement resource corresponds to a type that the control node occupies the carrier on the unlicensed band, or indicating that the interference measurement resource corresponds to a type that the control node does not occupy the carrier on the unlicensed band. The measurement unit is adapted to generate the CQI report according to one or more measurement results on the same type of interference measurement resource, wherein the measurement results on interference measurement resources of different types cannot be combined.

In accordance with embodiment 3, the UE provided by the present disclosure further includes a carrier occupancy detecting unit, adapted to detect a carrier occupancy situation on the unlicensed band. The measurement unit is adapted to perform the CSI measurement according to the carrier occupancy situation on the unlicensed band. The reporting unit is adapted to transmit the CQI report to the control node. Herein, when the control node occupies the unlicensed band, the UE performs the CSI measurement on the predefined channel measurement and interference measurement resource.

Further, the predefined channel measurement and interference measurement resource is a first subframe in which the control node occupies the unlicensed band; and/or, the predefined channel measurement and interference measurement resource is on a predefined position of a subframe in which a preamble is transmitted.

Preferably, if the length of the first subframe in which the control node occupies the unlicensed band or the subframe in which the preamble is transmitted is not enough for mapping the predefined channel measurement resource and/or interference measurement resource, the UE performs the CSI measurement on the predefined channel measurement resource and interference measurement resource in a next subframe.

As to the UE in embodiment 3, in one example, the measurement unit combines merely the CSI measurement results of the same carrier occupation situation. If there is data transmission in the subframe where the predefined channel measurement and interference measurement resource is located, the UE further includes a data transmission unit, adapted to perform a rate matching or punching to the data transmission, so as to avoid mapping to the predefined channel measurement and interference measurement resource; and/or, receive data according to a predefined rate matching or punching manner based on the predefined channel measurement or interference measurement resource indicated by the control node.

The predefined rate matching or punching manner may be indicated by at least one bit transmitted by the control node. The bit may be in the DCI of the UE-specific search space and is configured as enabled or disabled via higher layer signaling. The higher layer signaling may be UE-specific or cell-specific or group-specific.

In accordance with embodiments 4 and 5, the UE provided by the present disclosure may further include a configuration information receiving unit and a valid downlink subframe determining unit based on any one of the aforementioned three UEs. The configuration information receiving unit is adapted to receive the CSI reference signal configuration information and/or CSI interference measurement resource configuration information transmitted by the control node. The valid downlink subframe determining unit is adapted to determine toward earlier subframes from the subframe where the resource indicated by the received configuration information is located in turn whether a subframe where the indicated resource is located is a valid downlink subframe, inform the measurement unit to generate the CQI report according to the valid downlink subframe if yes. Accordingly, the measurement unit performs the measurement on the valid downlink subframe according to the notification of the valid downlink subframe determining unit and generates the CQI report. If it is determined that the subframe is not a valid downlink subframe, the above determination is kept on until a valid downlink subframe is found.

More specifically, in accordance with embodiment 4, the valid downlink subframe determining unit determines that the current subframe is a valid downlink subframe if the current subframe is one of subframes can be used for downlink transmission on the downlink carrier or one of subframes can be used for downlink transmission configured by the system and meets requirements defined in TS 36.213 7.2.3, and determines the current subframe is not a valid downlink subframe if otherwise.

In accordance with embodiment 5, if the control node does not occupy the carrier on the unlicensed band in the current subframe, the valid downlink subframe determining unit determines that the current subframe where the indicated resource is located is not a valid downlink subframe. If all or more than a predefined proportion of the resource indicated by the configuration information is within the part of the subframe in which the control node occupies the carrier on the unlicensed band and the subframe meets requirements defined in TS 36.213 7.2.3, the valid downlink subframe determining unit determines that the subframe where the indicated resource is located is a valid downlink subframe; otherwise, determine that the subframe where the indicated resource is located is not a valid downlink subframe. As to the situation that all of the resource indicated by the configuration information is within the part of the subframe in which the control node occupies the unlicensed band, it may include: all of the CSI interference measurement resource is within the part of the subframe in which the control node occupies the unlicensed band, or both the CSI interference measurement resource and the CSI channel measurement resource are within the part of the subframe in which the control node occupies the unlicensed band.

In accordance with embodiments 6 and 7, the UE provided by the present disclosure may further include a configuration information receiving unit, a first valid downlink subframe determining unit and a second valid downlink subframe determining unit based on any one of the three UEs described above. The newly added configuration information receiving unit is adapted to receive the CSI reference signal configuration information or CSI interference measurement resource configuration information. The first valid downlink subframe determining unit is adapted to determine toward earlier subframes from subframe n-n$_{CQI\_ref}$ in turn whether each subframe is a valid downlink subframe, notify the measurement unit to generate the CQI report based on the valid downlink subframe determined by the first valid downlink subframe determining unit and end the determination operation if yes, and keep on the determination operation until a valid downlink subframe is found if otherwise. Accordingly, the measurement unit is further adapted to determine whether the first valid downlink subframe is a subframe where the resource indicated by the received CSI reference signal configuration information and/or CSI interference measurement resource configuration information is located, perform the CSI measurement on the resource of the first valid downlink subframe in which the unlicensed band is occupied and generate the CQI report if yes, and notify the second valid downlink subframe determining unit to find a second valid downlink subframe if otherwise. The second valid downlink subframe determining unit is adapted to determine, toward earlier subframes in turn from the first valid downlink subframe after being notified by the measurement unit, each subframe where the resource indicated by the CSI reference signal configuration information and/or CSI interference measurement resource configuration information is located is a valid downlink subframe, until find a valid downlink subframe, and take the valid downlink subframe as the second valid downlink subframe and notify the measurement unit of the second valid downlink subframe. The measurement unit is further adapted to perform the CSI measurement on the second valid downlink subframe, take the second valid downlink subframe as the CSI reference resource subframe, and generate the CQI report according to the first valid downlink subframe.

More specifically, in accordance with embodiment 6, the valid downlink subframe determining manner of the first valid downlink subframe determining unit and the second valid downlink subframe determining unit is the same as the valid downlink subframe determining manner of the valid downlink subframe determining unit in embodiment 4.

In accordance with embodiment 7, when the first valid downlink subframe determining unit determines whether a subframe is a valid downlink subframe, if the control node does not occupy the carrier on the unlicensed band in the subframe, the subframe is not a valid downlink subframe. If the control node occupies the carrier on the unlicensed band in all parts or more than a predefined proportion of the subframe and the requirement of TS 36.213 7.2.3 is met, the subframe is a valid downlink subframe, otherwise, the subframe is not a valid downlink subframe. The valid downlink subframe determining manner of the second valid downlink subframe determining unit is the same as the valid downlink subframe determining manner of the valid downlink subframe determining unit in embodiment 5. As described in the above method embodiments, although a slight difference may exist in the determining manners of the first valid downlink subframe determining unit and the second valid downlink subframe unit, they have the same idea and thus the determining manners may be regarded as the same.

In accordance with embodiment 8, the UE provided by this embodiment is based on the UE provided by the embodiment 6 or 7. The difference relies in that, the valid downlink subframe determining manners of the first valid downlink subframe determining unit and the second valid downlink subframe determining unit are different. For example, the first valid downlink subframe determining unit adopts the manner of embodiment 4 (in particular, the manner of the first valid downlink subframe determining unit in embodiment 7), whereas the second valid downlink subframe determining unit adopts the manner in embodiment 5.

The foregoing descriptions are only preferred embodiments of this disclosure and are not for use in limiting the protection scope thereof. Any changes and modifications can be made by those skilled in the art without departing from the spirit of this disclosure and therefore should be covered within the protection scope as set by the appended claims.

The invention claimed is:

1. A method for transmitting a channel quality indicator (CQI) report by a user equipment (UE), the method comprising:
   receiving, by the UE, configuration information indicating resources for a channel state information (CSI) measurement;
   receiving, by the UE, signaling information indicating that a base station occupies a carrier on an unlicensed band in at least one subframe, from the base station;
   identifying, by the UE, at least one subframe in which the base station occupies the carrier on the unlicensed band, based on the signaling information;
   generating a CQI report based on measurement results at the at least one identified subframe, while excluding a measurement result of at least one subframe in which the base station does not occupy a carrier on the unlicensed band; and
   transmitting the CQI report to the base station.

2. The method of claim 1, wherein the configuration information includes channel measurement and/or interference measurement resource configuration information, which indicates aperiodic channel measurement and/or interference measurement resource.

3. The method of claim 1, wherein the configuration information comprises
   CSI reference signal configuration information and/or CSI interference measurement resource configuration information, and
   wherein the method further comprises determining, by the UE toward earlier subframes from subframe n-n$_{CQI\_ref}$ or a most recent subframe before subframe n-nCQI-ref where a resource indicated by the CSI reference signal configuration information and/or CSI interference measurement resource configuration information is located in turn, whether a subframe where the indicated resource is located is a valid downlink subframe.

4. The method of claim 3, further comprising determining, by the UE, if the base station does not occupy the unlicensed band in a subframe where the resource indicated by the CSI reference signal configuration information and/or CSI interference measurement resource configuration information is located, the subframe where the resource indicated by the CSI reference signal configuration information and/or CSI interference measurement resource configuration information is located, is not a valid downlink subframe.

5. The method of claim 1, wherein the configuration information comprises channel measurement and/or interference measurement resource pattern information, and
   wherein the channel measurement and/or interference measurement resource pattern information comprises indication information of one of N preconfigured patterns configured by higher layer.

6. The method of claim 1, further comprising:
   detecting, by the UE, reference signals transmitted in the at least one identified subframe.

7. The method of claim 1, wherein the signaling information is included in a signaling for indicating the at least one subframe occupied by the base station, or a signaling for scheduling the UE in the at least one subframe.

8. A user equipment (UE) for transmitting a channel quality indicator (CQI) report, the UE comprising:
   a transceiver configured to:
      receive configuration information indicating resources for a channel state information (CSI) measurement, and
      receive signaling information indicating that the base station occupies a carrier on an unlicensed band in at least one subframe; and
   a processor configured to:
      identify at least one subframe in which the base station occupies a carrier on the unlicensed band based on the signaling information,
      generate a CQI report based on measurement results at the at least one identified subframe, while excluding a measurement result of at least one subframe in which the base station does not occupy a carrier on the unlicensed band; and
      control the transceiver to transmit the CQI report to the base station.

9. The UE of claim 8, wherein the
   configuration information includes channel measurement and/or interference measurement resource configuration information, which indicates aperiodic channel measurement and/or interference measurement resource.

10. The UE of claim 8, wherein the configuration information comprises
    CSI reference signal configuration information and/or CSI interference measurement resource configuration information, and
    wherein the processor is further configured to determine toward earlier subframes from subframe n-n$_{CQI\text{-}ref}$ or a most recent subframe before subframe n-n$_{CQI\text{-}ref}$ where the resource indicated by the CSI reference signal configuration information and/or CSI interference measurement resource configuration information is located in turn, whether a subframe where the indicated resource is located is a valid downlink subframe.

11. The UE of claim 10, wherein, if the base station does not occupy the unlicensed band in a subframe where the resource indicated by the CSI reference signal configuration information and/or CSI interference measurement resource configuration information is located, the processor is further configured to determine the subframe where the resource indicated by the CSI reference signal configuration information and/or CSI interference measurement resource configuration information is located, is not a valid downlink subframe.

12. The UE of claim 8, wherein the configuration information comprises channel measurement and/or interference measurement resource pattern information, and
    wherein the channel measurement and/or interference measurement resource pattern information comprises: indication information of one of N preconfigured patterns configured by higher layer.

13. The UE of claim 8, wherein the processor is further configured to detect reference signals transmitted in the at least one identified subframe.

14. The UE of claim 8, wherein the signaling information is included in a signaling for indicating the at least one subframe occupied by the base station, or a signaling for scheduling the UE in the at least one subframe.

\* \* \* \* \*